United States Patent
Yuasa et al.

(10) Patent No.: US 10,516,144 B2
(45) Date of Patent: Dec. 24, 2019

(54) ENERGY STORAGE APPARATUS

(71) Applicants: GS Yuasa International Ltd., Kyoto-shi (JP); Honda Motor Co., Ltd., Tokyo (JP)

(72) Inventors: Eiji Yuasa, Kyoto (JP); Kentaro Shibuya, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 15/435,176

(22) Filed: Feb. 16, 2017

(65) Prior Publication Data

US 2017/0244076 A1  Aug. 24, 2017

(30) Foreign Application Priority Data

Feb. 19, 2016 (JP) ................................. 2016-030357
Feb. 6, 2017 (JP) ................................. 2017-019653

(51) Int. Cl.
*H01M 2/10* (2006.01)
*H01M 2/20* (2006.01)

(52) U.S. Cl.
CPC ......... *H01M 2/1016* (2013.01); *H01M 2/202* (2013.01)

(58) Field of Classification Search
CPC ........ H01M 2/20; H01M 2/202; H01M 2/204; H01M 2/206; H01M 2/208; H01M 2/34; H01M 2/1016
See application file for complete search history.

(56) References Cited

U.S. PATENT DOCUMENTS

| | | | | |
|---|---|---|---|---|
| 2012/0115014 A1* | 5/2012 | Park | ...................... | H01M 2/206 429/159 |
| 2013/0029540 A1 | 1/2013 | Tong et al. | | |
| 2013/0330594 A1* | 12/2013 | Soleski | ................ | H01R 11/282 429/158 |

FOREIGN PATENT DOCUMENTS

| | | |
|---|---|---|
| JP | 2013-120690 A | 6/2013 |
| JP | 2013-206840 A | 10/2013 |
| JP | 2014-524126 A | 9/2014 |

* cited by examiner

*Primary Examiner* — Adam A Arciero
(74) *Attorney, Agent, or Firm* — McGinn I.P. Law Group PLLC.

(57) ABSTRACT

Provides is an energy storage apparatus which includes: a plurality of energy storage devices disposed in a row in a first direction, and a bus bar configured to connect external terminals of energy storage devices to each other, wherein the bus bar includes a first member having a first connection portion connected to the external terminal of one energy storage device and a first extension portion extending from the first connection portion; and a second member having a second connection portion connected to the external terminal of another energy storage device and a second extension portion extending from the second connection portion, and the first extension portion has a first conductive surface, and the second extension portion has a second conductive surface which is made to overlap with the first conductive surface in a separable manner in a state where the second conductive surface faces the first conductive surface.

17 Claims, 19 Drawing Sheets

ENERGY STORAGE APPARATUS

CROSS-REFERENCE TO RELATED APPLICATIONS

This application is based on Japanese Patent Applications No. 2016-030357 filed on Feb. 19, 2016, and No. 2017-019653 filed on Feb. 6, 2017, the entire contents of which are hereby incorporated by reference.

FIELD

The present invention relates to an energy storage apparatus which includes energy storage devices having external terminals, and bus bars connected to the external terminals.

BACKGROUND

Conventionally, there has been known an assembled battery which includes a plurality of battery cells (see JP 2013-120690 A). To be more specific, the assembled battery includes: a plurality of battery cells each having electrode terminals formed of a positive electrode terminal and a negative electrode terminal; and a plurality of bus bars which connect the electrode terminals so as to connect all battery cells in series.

In the above-mentioned assembled battery, an end portion of the bus bar, to which the positive electrode terminal of the battery cell positioned on one end of a path through which electricity flows is connected, corresponds to a positive electrode side terminal which functions as a total terminal of the whole assembled battery. On the other hand, an end portion of the bus bar, to which the negative electrode terminal of the battery cell positioned on the other end of a path through which electricity flows is connected, corresponds to a negative electrode side terminal which functions as a total terminal of the whole assembled battery.

In the above-mentioned assembled battery, the bus bar is connected (fixed) to the electrode terminal by laser welding or arc welding and hence, the bus bar cannot be easily removed from the electrode terminal. Accordingly, in the assembled battery, electricity can be always inputted to or outputted from the positive electrode side terminal (total terminal on a positive electrode side) and the negative electrode side terminal (total terminal on a negative electrode side). As a result, in the assembled battery, even when inputting or outputting of electricity is unnecessary at the time of mounting the assembled battery on an apparatus or the like, on which the assembled battery is mounted, or at the time of transporting the assembled battery, a state is maintained where electricity can be inputted to or outputted from the positive electrode side terminal or the negative electrode side terminal.

On the other hand, when the bus bar is connected to the electrode terminal by bolts or the like, the bus bar can be removed from the electrode terminal. However, when a torque generated at the time of connection by the bolts is applied to the electrode terminal frequently, there is a possibility that gas-tightness of the battery cell is affected. In view of the above, there has been a demand for a technique which can bring about a state where electricity cannot be inputted to or outputted from the positive electrode side terminal or the negative electrode side terminal in the assembled battery at portions of the battery cell except for the above-mentioned electrode terminals of the battery cell.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which can assume a state where electricity cannot be inputted to or outputted from the energy storage apparatus.

An energy storage apparatus according to an aspect of the present invention includes: a plurality of energy storage devices disposed in a row in a first direction and each having an external terminal; and a bus bar configured to make the external terminals of the different energy storage devices conductive with each other, wherein the bus bar includes at least a first member connected to the external terminal of a predetermined energy storage device among the plurality of energy storage devices, and a second member connected to the external terminal of another energy storage device among the plurality of energy storage devices, the first member and the second member form a conductive path by being directly or indirectly conductive with each other, and the conductive path has a middle portion thereof formed in a separable or interrupting manner.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
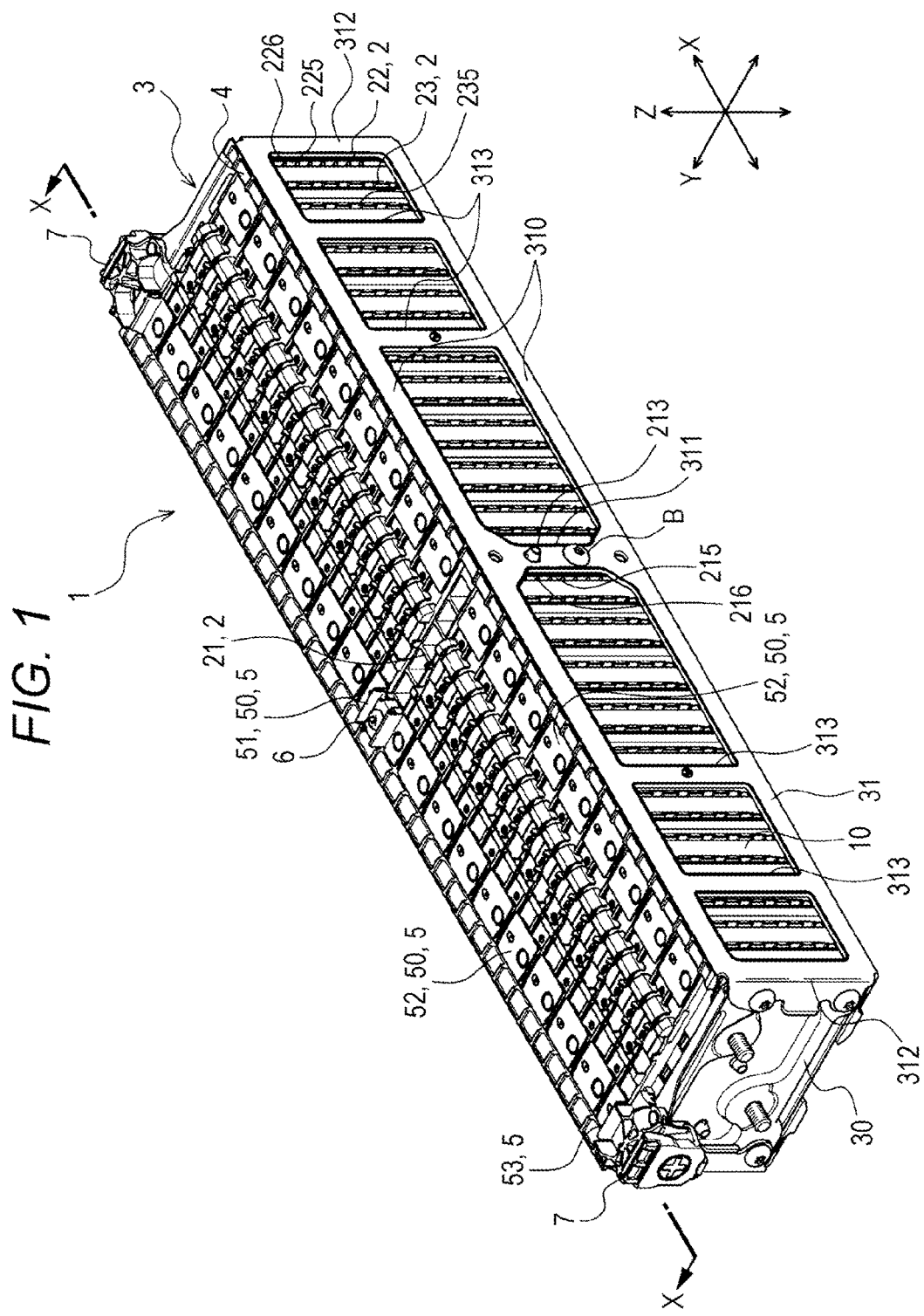
FIG. 1 is a perspective view of an energy storage apparatus according to an embodiment of the present invention.

According to an aspect of the present invention, there is provided an energy storage apparatus including: a plurality of energy storage devices disposed in a row in a first direction and each having an external terminal; and a bus bar configured to make the external terminals of the different energy storage devices conductive with each other, wherein the bus bar includes at least a first member connected to the external terminal of a predetermined energy storage device among the plurality of energy storage devices, and a second member connected to the external terminal of another energy storage device among the plurality of energy storage devices, the first member and the second member form a conductive path by being directly or indirectly conductive with each other, and the conductive path has a middle portion thereof formed in a separable or interrupting manner.

With such a configuration, by separating or interrupting the middle portion of the conductive path, it is possible to bring about a state where electricity cannot be inputted to or outputted from the energy storage apparatus.

In the energy storage apparatus, the first member may include a first connection portion connected to the external terminal of the predetermined energy storage device among the plurality of energy storage devices and a first extension portion extending from the first connection portion, the second member may include a second connection portion connected to the external terminal of another energy storage device among the plurality of energy storage devices and a second extension portion extending from the second connection portion, the first extension portion may have a first conductive surface, and the second extension portion may have a second conductive surface which is made to overlap with the first conductive surface in a separable manner in a state where the second conductive surface faces the first conductive surface.

With such a configuration, the first conductive surface and the second conductive surface are brought into a state where the first conductive surface and the second conductive surface are made to overlap with each other in a separable manner. Accordingly, by separating the first conductive surface and the second conductive surface from each other, it is possible to bring about a state where electricity cannot be inputted to or outputted from the energy storage apparatus.

In this case, the first conductive surface and the second conductive surface may respectively be a flat surface which includes the first direction.

With such a configuration, both conductive surfaces form the flat surfaces orthogonal to the second direction. Accordingly, even when an error in manufacture or the like occurs with respect to a distance (a distance in the first direction) between the energy storage devices where the external terminals are connected to each other by the bus bar, the energy storage devices can be moved relative to each other in the first direction in a state where the first conductive surface and the second conductive are brought into surface contact with each other. As a result, even when the above-mentioned error in manufacture or the like occurs, it is possible to make the first conductive surface and the second conductive surface conductive with each other (face contact) with certainty.

In the energy storage apparatus, at least one of the first extension portion and the second extension portion may have a bent portion at a position closer to the first connection portion than a portion which includes the first conductive surface or the second conductive surface or at a position closer to the second connection portion than the portion which includes the first conductive surface or the second conductive surface.

Since at least one of the first extension portion and the second extension portion has the bent portion, even when a distance in the first direction between the energy storage devices whose external terminals are connected to each other by a bus bar changes, the bent portion expands or is bent so that it is possible to suppress the concentration of a stress caused by the change in a distance on the portions of the first member and the second members connected to the external terminals (first and second connection portions). Accordingly, it is possible to prevent the occurrence of damage on the first member and the second member caused by a change in the distance.

The energy storage apparatus may further include: an adjacent member disposed between the energy storage devices disposed adjacently to each other in the first direction; and a mounting member configured to be removably mounted on the adjacent member, wherein the bus bar may connect the external terminals of the energy storage devices disposed on both sides of the adjacent member to each other in the first direction, the mounting member may be configured to press a first conductive portion which is a portion including the first conductive surface of the first extension portion and a second conductive portion which is a portion including the second conductive surface of the second extension portion to the adjacent member, and the first conductive surface and the second conductive surface may respectively be a flat surface which intersects with a direction that the mounting member presses the first conductive portion and the second conductive portion toward the adjacent member.

With such a configuration, the first conductive portion and the second conductive portion are pressed to the adjacent member by the mounting member and hence, the first conductive surface and the second conductive surface are pressed to each other. Accordingly, even when vibrations or the like are applied to the energy storage apparatus, it is possible to maintain a conductive state between the first conductive portion and the second conductive portion with certainty.

In the energy storage apparatus, the bus bar may have a third member which is made to overlap with the first extension portion and the second extension portion from a side opposite to the adjacent member, the adjacent member may have a female threaded portion at a position where the adjacent member overlaps with the bus bar in the second direction, the mounting member may have a male threaded portion which is threaded into the female threaded portion in a state where the male threaded portion penetrates the first extension portion, the second extension portion and the third member in an overlapping state from a side of the third member, and the third member may have a contact portion which is brought into contact with the adjacent member in a rotational direction when the male threaded portion is threaded into the female threaded portion.

With such a configuration, the third member which sandwiches the first member and the second member in cooperation with the adjacent member has the contact portion which is brought into contact with the adjacent member in the rotational direction of the male threaded portion and hence, it is possible to prevent the transmission of a torque generated at the time of making the male threaded portion threadedly engage with the female threaded portion to the first member and the second member by the third member. Accordingly, it is possible to prevent a stress generated by such a torque from being applied to the connection portion connected to the external terminal.

The energy storage apparatus may further include an insulation member which is inserted between the first conductive surface and the second conductive surface such that the insulation member can be pulled out from between the first conductive surface and the second conductive surface.

With such a configuration, by inserting the insulation member between the first conductive surface and the second conductive surface or by pulling out the insulation member from between the first conductive surface and the second conductive surface, it is possible to change a state between a state where electricity can be inputted to or outputted from the energy storage apparatus and a state where electricity can be neither inputted to nor outputted from the energy storage apparatus. That is, when the insulation member is inserted between the first conductive surface and the second conductive surface, the conduction between the first conductive portion and the second conductive portion is shut off so that a state is brought about where electricity cannot be inputted to or outputted from the energy storage apparatus. On the other hand, when the insulation member is pulled out, the first conductive portion and the second conductive portion are made conductive with each other (the first conductive surface and the second conductive surface are brought into a face contact with each other) so that a state is brought about where electricity can be inputted to or outputted from the energy storage apparatus.

In the energy storage apparatus, the first extension portion may have a first guide portion extending from an end edge of the first conductive surface, the second extension portion may have a second guide portion extending from a position of an end edge of the second conductive surface which corresponds to the first guide portion, and a distance between the first guide portion and the second guide portion may be increased as the first guide portion and the second guide portion are away from the first conductive surface and the second conductive surface.

With such a configuration, as the first guide portion and the second guide portion approaches to a position where the first conductive surface and the second conductive surface overlap with each other, the distance between the first guide portion and the second guide portion is decreased. Therefore, in an operation of inserting a member such as the insulation member between the first conductive surface and the second conductive surface, the member is guided to the first guide portion and the second guide portion. Accordingly, the member can be easily inserted between the first conductive surface and the second conductive surface.

In the energy storage apparatus: an adjacent member may be disposed between the energy storage devices disposed adjacently to each other in a first direction, the bus bar may include a connection member which connects the first member and the second member to each other in a conductive manner, and connects external terminals of the energy storage devices disposed on both sides of the adjacent member in the first direction to each other, and the connection member may be brought into contact with at least one of the first member and the second member in a separable manner.

With such a configuration, by separating the connection member from at least one of the first member and the second member, the middle portion of the conductive path is interrupted and hence, it is possible to bring about a state where electricity cannot be inputted to or outputted from the energy storage apparatus.

According to another aspect of the present invention, there is provided an energy storage apparatus including: an energy storage device having an external terminal; a total terminal used for inputting or outputting electricity from or to the outside; and a bus bar for electrically connecting the external terminal and the total terminal to each other, wherein the bus bar includes: a first member having a first connection portion connected to the external terminal and a first extension portion extending from the first connection portion; and a second member having a second connection portion connected to the total terminal and a second extension portion extending from the second connection portion, and the first extension portion has a first conductive surface, and the second extension portion has a second conductive surface which is made to overlap with the first conductive surface in a separable manner in a state where the second conductive surface faces the first conductive surface.

With such a configuration, the first conductive surface and the second conductive surface are brought into a state where the first conductive surface and the second conductive surface are made to overlap with each other in a separable manner. Accordingly, by separating the first conductive surface and the second conductive surface from each other, it is possible to bring about a state where electricity cannot be inputted to or outputted from the energy storage apparatus.

As described above, according to the present invention, it is possible to provide an energy storage apparatus which can be brought into a state where electricity cannot be inputted to or outputted from the energy storage apparatus.

Hereinafter, one embodiment of the present invention is described with reference to FIG. 1 to FIG. 12. Names of respective constitutional members (respective constitutional elements) of this embodiment are used only for this embodiment, and may differ from names of respective constitutional members (respective constitutional elements) used in BACKGROUND.

Figure 2:
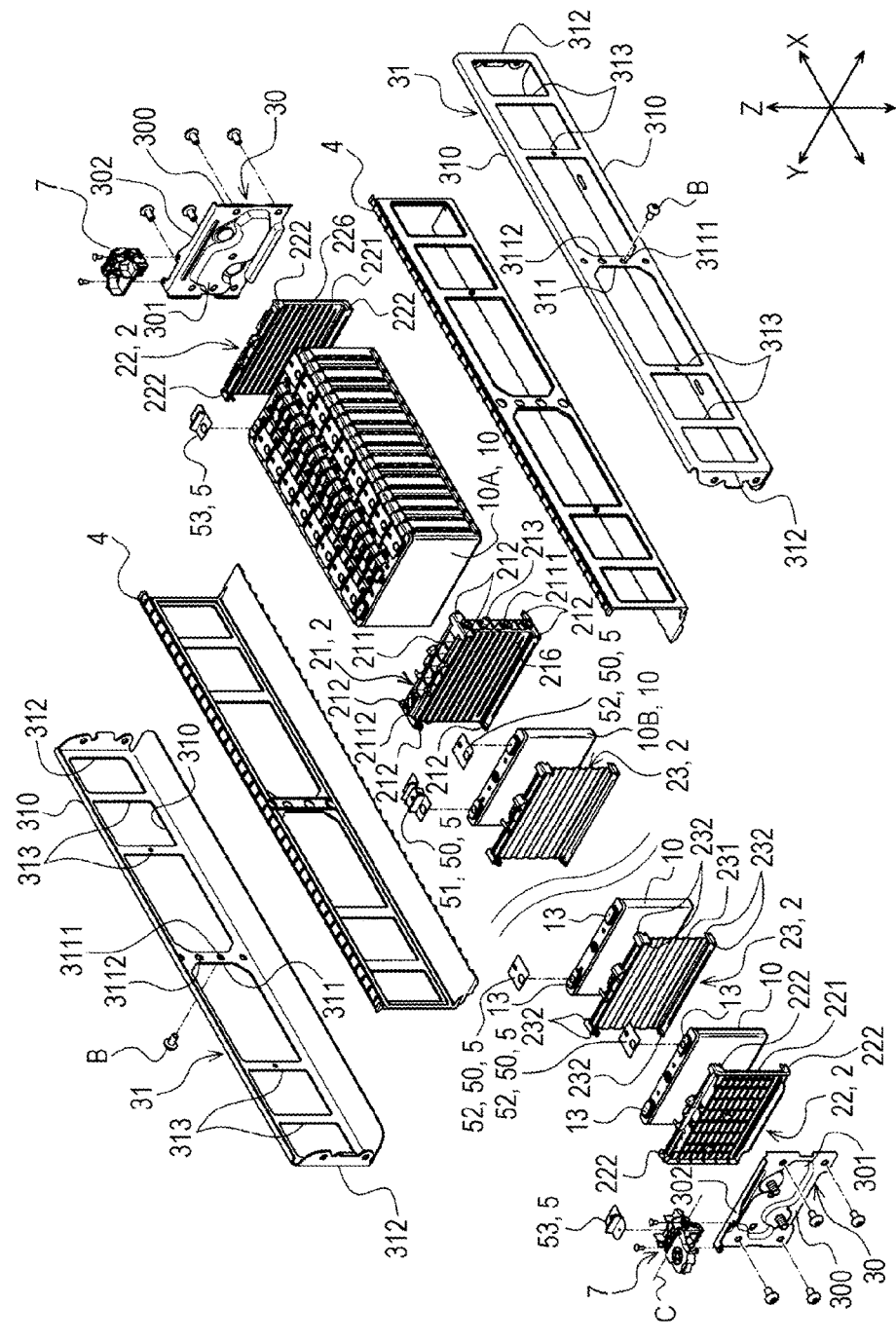
FIG. 2 is an exploded perspective view of a configuration of the energy storage apparatus in a state where the description of parts of the configuration is omitted.

As shown in FIG. 1 and FIG. 2, an energy storage apparatus includes: a plurality of energy storage devices 10 which are arranged in a row in a predetermined direction and each of which has external terminals 13; and a plurality of bus bars 5 each of which makes the external terminals 13 of the adjacent energy storage devices 10 conductive with each other. The energy storage apparatus 1 also includes: a plurality of adjacent members 2 each of which is disposed adjacently to the energy storage device 10; a holder 3 which collectively holds the plurality of energy storage devices 10 and the plurality of adjacent members 2; and insulators 4 which are disposed between the plurality of energy storage devices 10 and the holder 3. The energy storage apparatus 1 of this embodiment includes a mounting member 6 which is removably mounted on the adjacent member 2. The energy storage apparatus 1 further includes a pair of terminal bases 7 having a total terminal 71 for inputting electricity from the outside of the energy storage apparatus 1 and a total terminal 71 for inputting electricity to the outside of the energy storage apparatus 1 respectively (see FIG. 10).

Figure 3:
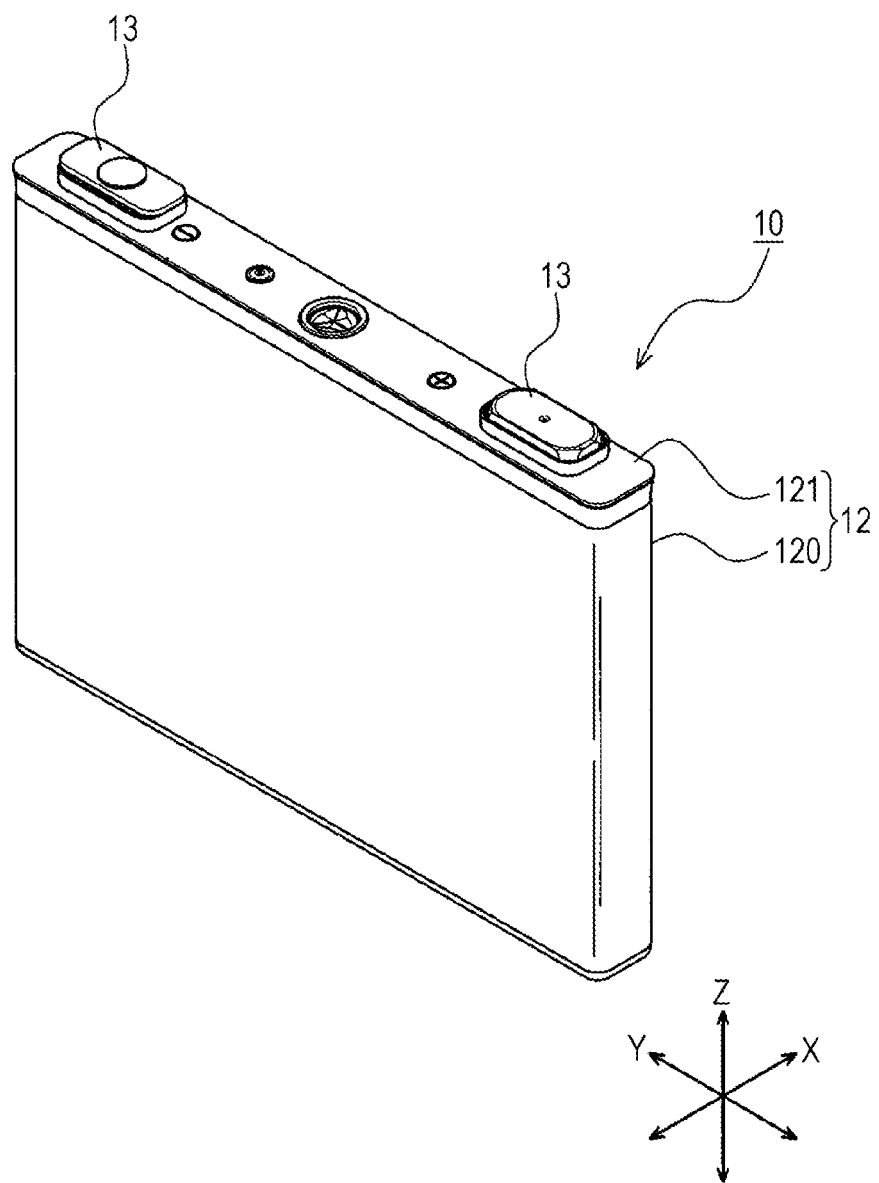
FIG. 3 is a perspective view of an energy storage device used in the energy storage apparatus.
Figure 4:
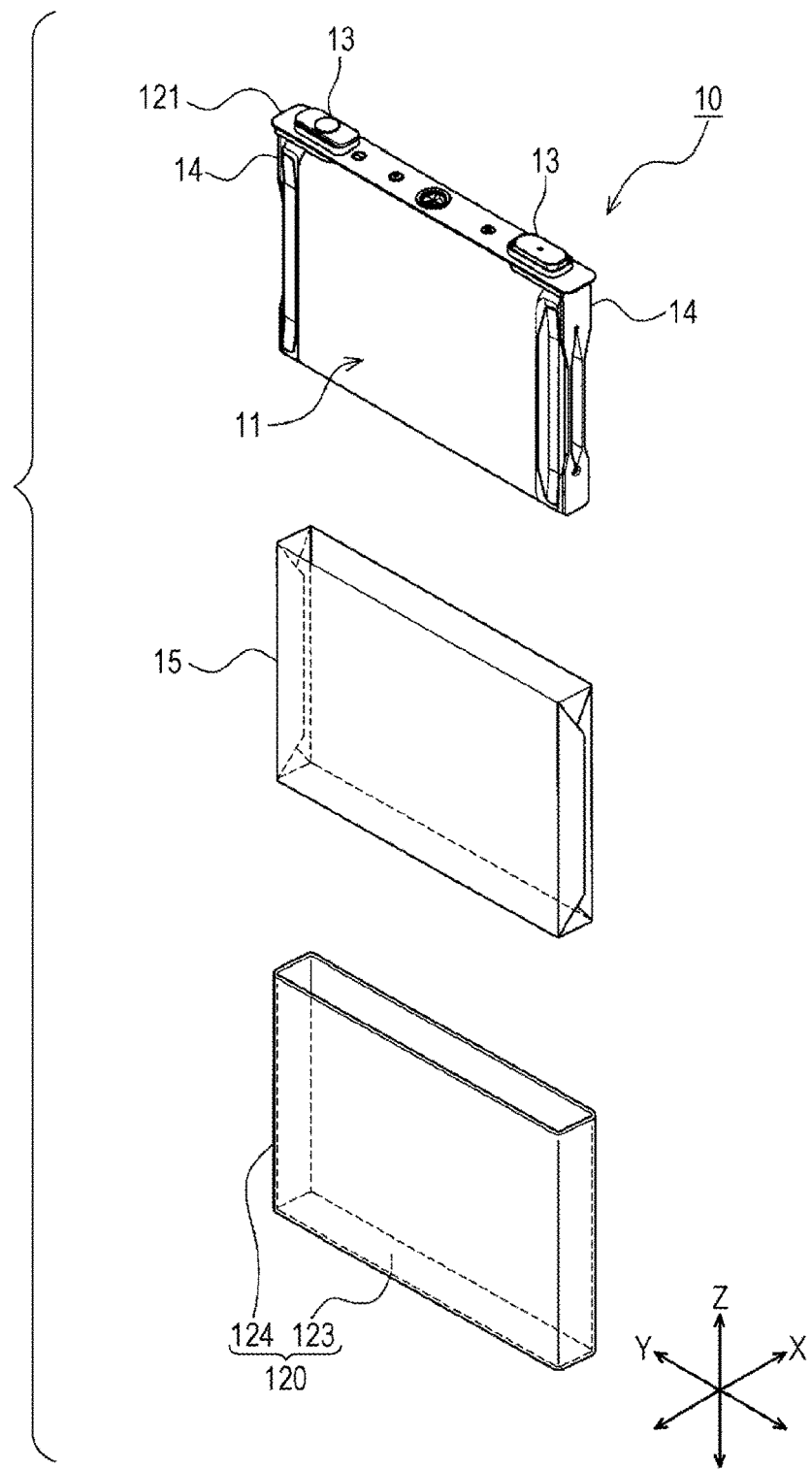
FIG. 4 is an exploded perspective view of the energy storage device.

As also shown in FIG. 3 and FIG. 4, each of the plurality of energy storage devices 10 includes: an electrode assembly 11 which includes a positive electrode and a negative electrode; a case 12 which houses the electrode assembly 11; and the pair of external terminals 13 disposed on an outer surface of the case 12.

The case 12 includes: a case body 120 having an opening; and a lid plate 121 which closes the opening of the case body 120. In this embodiment, the case 12 has a rectangular parallelepiped shape.

The case body 120 includes: a rectangular-plate-like closed portion 123; and a cylindrical barrel portion 124 which is connected to a periphery of the closed portion 123. The barrel portion 124 has a prismatic cylindrical shape along a profile of the closed portion 123, that is, a flat prismatic cylindrical shape. One end of the barrel portion 124 is closed by the closed portion 123, and the other end of the barrel portion 124 is opened. That is, the case body 120 has a flat bottomed prismatic cylindrical shape.

The lid plate 121 is a plate-like member which closes the opening of the case body 120. To be more specific, the lid plate 121 has a profile which corresponds to a peripheral edge portion of the opening of the case body 120 as viewed in the normal direction. In this embodiment, the pair of external terminals 13 is mounted on the lid plate 121 in a state where the pair of external terminals 13 is electrically connected to respective electrodes (the positive electrode, the negative electrode) of the electrode assembly 11. In this embodiment, on the lid plate 121, the pair of external terminals 13 is disposed in a spaced-apart manner in a longitudinal direction of the lid plate 121 having a rectangular shape.

With respect to the case 12 having the above-mentioned configuration, the opening of the case body 120 is closed by making a peripheral edge portion of the lid plate 121 overlap with the peripheral edge portion of the opening of the case body 120 in a state where the electrode assembly 11 is housed in the inside of the case 12, and a boundary portion between the lid plate 121 and the case body 120 is welded to each other in such a state.

In the energy storage apparatus 1 of this embodiment, the plurality of energy storage devices 10 each of which has the above-mentioned configuration are disposed. To be more specific, the plurality of energy storage devices 10 are arranged in a row such that wide wall portions of barrel portions 124 of the respective energy storage devices 10 oppositely face each other. In the description made hereinafter, the direction along which the energy storage devices 10 are arranged in a row (the direction along which the wide wall portions of the barrel portions 124 opposedly face each other: first direction) is assumed as "X axis direction" in orthogonal coordinates system. The direction along which narrow wall portions of the barrel portions 124 of the energy storage devices 10 opposedly face each other (third direction) is assumed as "Y axis direction" in orthogonal coordinates system, and the direction along which the lid plate 121 and the closed portion 123 of the energy storage device 10 opposedly face each other (second direction) is assumed as "Z axis direction" in orthogonal coordinates system. In accordance with such orthogonal coordinates system, orthogonal coordinate axes which respectively correspond to the X axis direction, the Y axis direction and the Z axis direction are described auxiliarily in the respective drawings.

Each adjacent member 2 is disposed between two energy storage devices 10 disposed adjacently to each other in the X axis direction or between the energy storage device 10 and a member which is disposed adjacently to the energy storage device 10 in the X axis direction (in this exemplified embodiment, a portion of the holder 3). As shown in FIG. 2, the adjacent members 2 include plural types of adjacent members. In this embodiment, the adjacent members 2 include: a first adjacent member (adjacent member) 21 which is disposed adjacently to the energy storage devices 10 disposed at an intermediate position in the X axis direction of the energy storage apparatus 1; second adjacent members 22 which are disposed adjacently to the outermost energy storage devices 10 out of the plurality of energy storage devices 10 arranged in a row in the X axis direction respectively; and third adjacent members 23 each of which is disposed adjacently to the energy storage devices 10 disposed between the first adjacent member 21 and the second adjacent members 22.

The first adjacent member 21 is disposed between the energy storage devices 10 which are disposed adjacently to each other in the X axis direction. With such a configuration, a predetermined distance (a creepage distance or the like) is ensured between the energy storage devices 10 which are disposed adjacently to each other in the X axis direction with the first adjacent member 21 interposed therebetween. The first adjacent member 21 is connected (fixed) to the holder 3.

To be more specific, the first adjacent member 21 has: a body portion (hereinafter referred to as "first body portion") 211 which is disposed adjacently to the energy storage device 10 (case body 120); and restricting portions (hereinafter referred to as "first restricting portions") 212 which restrict the movement of the energy storage devices 10 disposed adjacently to the first body portion 211 with respect to the first body portion 211. Further, the first adjacent member 21 has shaft portions 213 which engage with the holder 3.

The first body portion 211 has a rectangular profile which corresponds to the energy storage device 10 (case 12) disposed adjacently to the first body portion 211 as viewed in the X axis direction. The first body portion 211 has connection portions 2111 for fixing (connecting) the first body portion 211 to the holder 3, and bus bar support portions 2112 each of which supports the bus bar 5. Further, flow channels 215 which allow a cooling fluid (air in an example of this embodiment) to pass therethrough are formed between the first body portion 211 and the energy storage devices 10 disposed adjacently to the first body portion 211 in the X axis direction. To be more specific, on the first body portion 211, a plurality of projecting portions 216 each of which projects toward the adjacent energy storage device 10 (in the X axis direction) and extends in the Y axis direction are arranged in a row at intervals in the Z axis direction. With such a configuration, distal ends (distal ends in the projecting direction) of the projecting portions 216 are brought into contact with the energy storage devices 10 disposed adjacently to the first body portion 211 thus forming the flow channels 215 between the first adjacent member 21 and the energy storage devices 10. Further, with respect to the first adjacent member 21 of this embodiment, a size in the X axis direction of the first body portion 211 is larger than sizes in the X axis direction of portions of the second adjacent member 22 and the third adjacent member 23 which corresponds to the first body portion 211.

The connecting portions 2111 are formed on end portions of the first body portion 211 in the Y axis direction respectively. In this embodiment, the connecting portions 2111 are formed on both end portions of the first body portion 211 in the Y axis direction respectively. The connecting portion 2111 is a portion with which a bolt B is threadedly engaged in a state where the bolt B penetrates the holder 3. In the energy storage apparatus 1, due to threaded engagement of the bolts B with the corresponding connecting portions 2111, the first body portion 211 (first adjacent member 21) and the holder 3 are connected to each other. In this embodiment, the connecting portions 2111 are nuts which are embedded into the end portions of the first body portion 211 in the Y axis direction.

Figure 5:
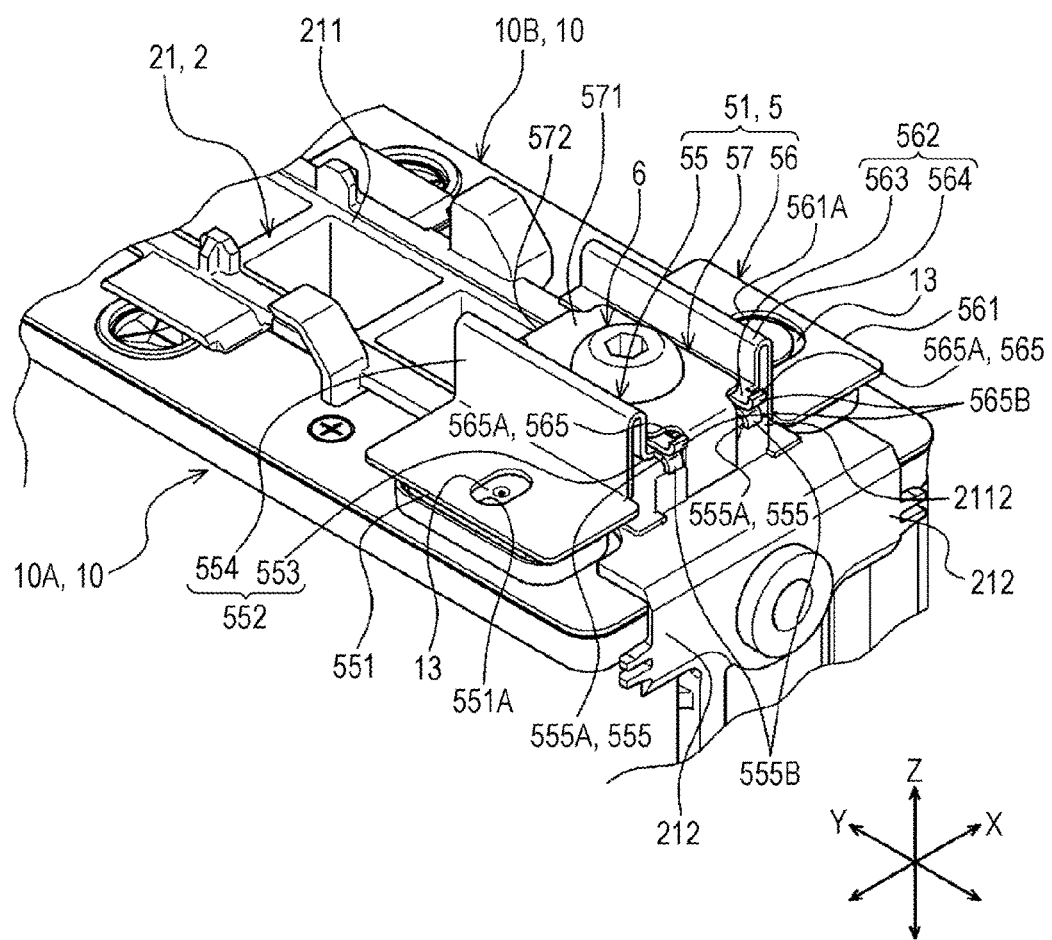
FIG. 5 is an enlarged perspective view of a first bus bar and parts around the first bus bar in the energy storage apparatus.
Figure 6:
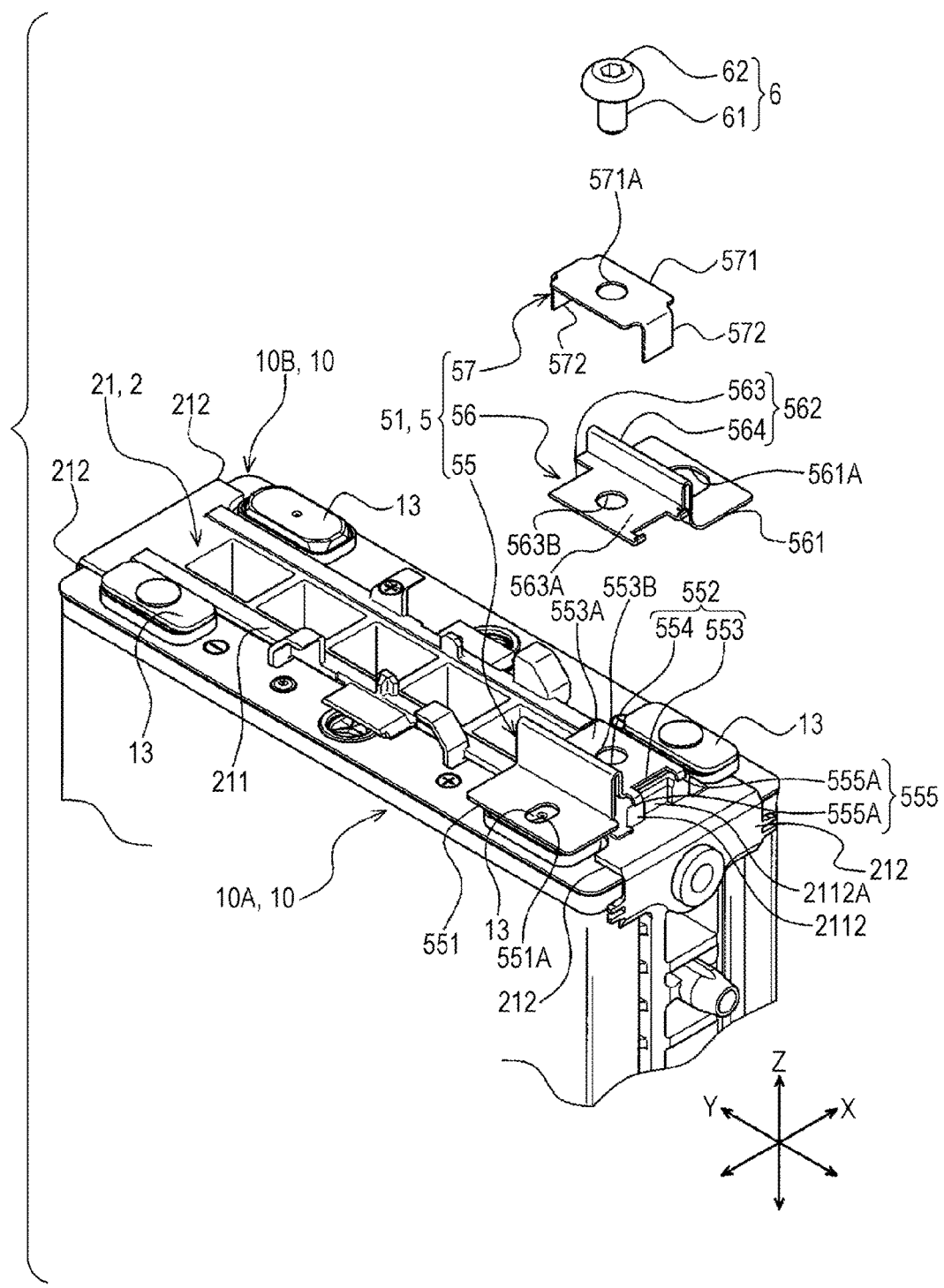
FIG. 6 is an exploded perspective view of the first bus bar and the parts around the first bus bar in the energy storage apparatus.
Figure 7:
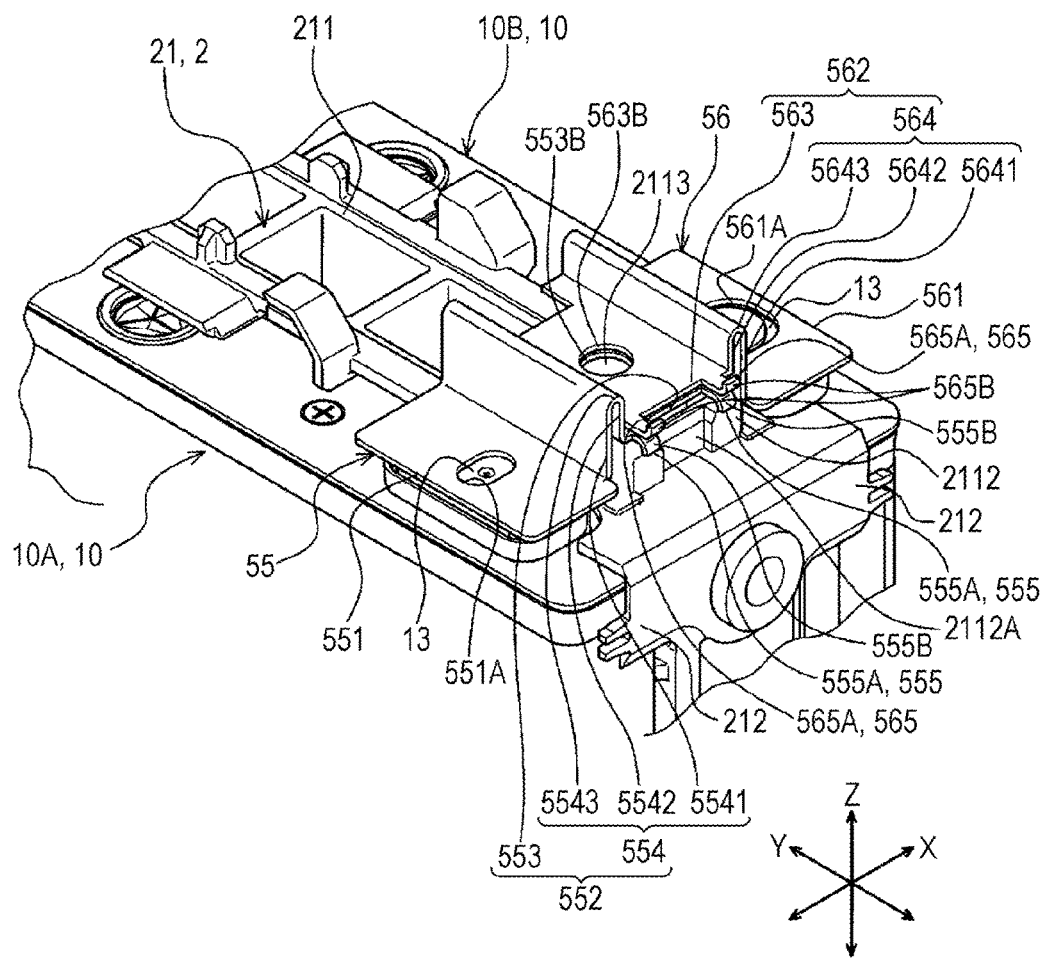
FIG. 7 is an enlarged perspective view of the first bus bar in a state where a mounting member and a third member are removed from the first bus bar and parts around the first bus bar.

As shown also in FIG. 5 and FIG. 6, the bus bar support portions 2112 are provided to one end portion (in the example of this embodiment, a side corresponding to the lid plate 121 of the energy storage device 10) of the first body portion 211 in the Z axis direction. The bus bar support portion 2112 is a portion partially projecting from an end surface of the first body portion 211 on one side. In this embodiment, the bus bar support portion 2112 is a portion having a rectangular parallelepiped shape provided at a position where the bus bar support portion 2112 overlaps with the bus bar 5 which makes the external terminals 13 of the energy storage devices 10 disposed on both sides of the first adjacent member 21 conductive with each other in the Z axis direction. The bus bar support portion 2112 has a groove 2112A extending in the Z axis direction on both ends thereof in the Y axis direction. Each groove 2112A is brought into contact with a portion of the bus bar 5 which extends in a straddling manner over the first adjacent member 21.

The bus bar support portion 2112 includes a fixing portion 2113 to which the bus bar 5 is fixed. The fixing portion 2113 is a female threaded portion. To be more specific, the fixing portion 2113 is a female threaded portion which opens in the Z axis direction at the end surface of the bus bar support portion 2112 in a projecting direction. In this embodiment, the fixing portion 2113 is a nut.

The first restricting portions 212 extend in the X axis direction from the first body portion 211 and are brought into contact with the energy storage device 10 (to be more specific, the case 12) disposed adjacently to the first body portion 211 from the outside in the Y-Z plane (a plane including the Y axis and the Z axis) direction thus restricting the relative movement of the energy storage device 10 in the Y-Z plane direction with respect to the first body portion 211. The first restricting portions 212 extend in the X axis direction from at least respective corner portions of the first body portion 211 thus forming surfaces (contact surfaces) which are brought into contact with corner portions of the energy storage device 10 (case 12) disposed adjacently to the first body portion 211 from the outside in the Y-Z plane.

The shaft portions 213 extend outward from ends of the first body portion 211 in the Y axis direction, and engage with the holder 3. In this embodiment, the shaft portions 213 extend outward from both ends of the first body portion 211 in the Y axis direction respectively. To be more specific, the shaft portions 213 extend in a circular columnar shape in the Y axis direction from the end portions of the first body portion 211 in the Y axis direction at an intermediate position in the Z axis direction, and are made to pass through the through holes 3112 which are formed in the holder 3 at positions corresponding to the shaft portions 213. In this embodiment, the shaft portions 213 are used for positioning the first adjacent member 21 with respect to the holder 3 at the time of connecting (fixing) the first adjacent member 21 to the holder 3 in the manufacture of the energy storage apparatus 1.

As shown in FIG. 1 and FIG. 2, the second adjacent member 22 is disposed between the energy storage device 10 and the holder 3 in the X-axis direction. With such a configuration, a predetermined distance (a creepage distance or the like) is ensured between the energy storage device 10 and the holder 3 which are disposed in the X-axis direction adjacently to each other with the second adjacent member 22 interposed therebetween.

To be more specific, the second adjacent member 22 has: a body portion (hereinafter referred to as "second body portion") 221 disposed adjacently to the energy storage device 10 (case body 120) and between the energy storage device 10 and the holder 3; and restricting portions (hereinafter referred to as "second restricting portions") 222 which restrict the movement of the energy storage device 10 disposed adjacently to the second body portion 221 with respect to the second body portion 221.

The second body portion 221 has a rectangular profile corresponding to the energy storage device 10 (case 12) disposed adjacently to the second body portion 221 as viewed in the X axis direction. Further, flow channels 225 which allow a cooling fluid (air in this exemplified embodiment) to pass therethrough are formed between the second body portion 221 and the energy storage device 10 disposed adjacently to the second body portion 221 in the X axis direction. To be more specific, on the second body portion 221, a plurality of projecting portions 226 each of which projects toward the adjacent energy storage devices 10 (in the X axis direction) and extends in the Y axis direction are arranged in a row at intervals in the Z axis direction. With such a configuration, distal ends (distal ends in the projecting direction) of the projecting portions 226 are brought into contact with the energy storage device 10 disposed adjacently to the second body portion 221 thus forming the flow channels 225 between the second adjacent member 22 and the energy storage device 10.

The second restricting portions 222 extend in the X axis direction from the second body portion 221, and are brought into contact with the energy storage device 10 disposed adjacently to the second body portion 221 (to be more specific, the case 12) from the outside in the Y-Z plane direction thus restricting the relative movement of the energy storage device 10 in the Y-Z plane direction with respect to the second body portion 221. The second restricting portions 222 extend in the X axis direction from at least respective corner portions of the second body portion 221 thus forming surfaces (contact surfaces) which are brought into contact with corner portions of the energy storage device 10 (case 12) disposed adjacently to the second body portion 221 from the outside in the Y-Z plane direction.

Between the first adjacent member 21 and the second adjacent member 22, the third adjacent member 23 is disposed between each two of the energy storage devices 10 disposed adjacently to each other in the X axis direction. With such a configuration, a predetermined distance (a creepage distance or the like) is ensured between the energy storage devices 10 which are disposed adjacently to each other in the X axis direction with the third adjacent member 23 interposed therebetween.

To be more specific, the third adjacent member 23 has: a body portion (hereinafter referred to as "third body portion") 231 which is disposed adjacently to the energy storage device 10 (case body 120); and restricting portions (hereinafter referred to as "third restricting portions") 232 which restrict the movement of the energy storage devices 10 disposed adjacently to the third body portion 231 with respect to the third body portion 231.

The third body portion 231 has a rectangular profile which corresponds to the energy storage device 10 (case 12) disposed adjacently to the third body portion 231 as viewed in the X axis direction. Further, flow channels 235 which allow a cooling fluid (air in this exemplified embodiment) to pass therethrough are formed between the first body portion 211 and the energy storage devices 10 disposed adjacently to the first body portion 211 in the X axis direction. To be more specific, the third body portion 231 has a rectangular corrugated cross sectional shape. With such a configuration, the third body portion 231 is brought into contact with the energy storage devices 10 disposed adjacently to the third body portion 231 thus forming the flow channels 235 between the third body portion 231 and the energy storage devices 10.

The third restricting portions 232 extend in the X axis direction from the third body portion 231 and are brought into contact with the energy storage devices 10 (to be more specific, the cases 12) disposed adjacently to the third body portion 231 from the outside in the Y-Z plane direction thus restricting the relative movement of the energy storage devices 10 in the Y-Z plane direction with respect to the third body portion 231. The third restricting portions 232 extend in the X axis direction from at least respective corner portions of the third body portion 231 thus forming surfaces (contact surfaces) which are brought into contact with corner portions of the energy storage devices 10 (the case 12) disposed adjacently to the third body portion 231 from the outside in the Y-Z plane direction.

The holder 3 collectively holds the plurality of energy storage devices 10 and the plurality of adjacent members 2 by surrounding the peripheries of the plurality of energy storage devices 10 and the plurality of adjacent members 2. The holder 3 is made of a material having conductivity. To be more specific, the holder 3 includes: a pair of end members 30 which is disposed such that the plurality of energy storage devices 10 are positioned therebetween in the X axis direction; and oppositely facing members 31 which connect the pair of end members 30 to each other in a state where the oppositely facing members 31 oppositely face the plurality of energy storage devices 10 in the Y axis direction. In the energy storage apparatus 1 of this embodiment, the pair of end members 30 is disposed such that each of the pair of end members 30 sandwiches the second adjacent member 22 in cooperation with the energy storage device 10 disposed on an end of a unit formed of the plurality of energy storage devices 10 in the X axis direction, and the pair of oppositely facing members 31 is disposed on both sides in the Y axis direction of the unit formed of the plurality of energy storage devices 10 which are arranged in a row in the X axis direction.

The pair of end members 30 expands in the Y-Z plane direction respectively. To be more specific, each of the pair of end members 30 includes: a body 300 having a profile (a rectangular profile in this embodiment) which corresponds to the energy storage device 10; a pressure contact portion 301 which projects toward the second body portion 221 of the second adjacent member 22 from the body 300 and is brought into contact with the second adjacent member 22; and a support lug 302 on which the terminal base 7 is mounted. The support lug 302 is a plate-like portion which extends in the X axis direction from one of four sides (end edges) of the body 300 which form the profile of the body 300 and corresponds to the lid plate 121 of the energy storage device 10, and is elongated in the Y axis direction.

Each of the pair of oppositely facing members 31 includes: a pair of beam portions 310 which extends in the X axis direction and is disposed in a spaced-apart manner in the Z axis direction; a first connecting portion 311 which connects the pair of beam portions 310 to each other at an intermediate position in the X axis direction (in this exemplified embodiment, a position overlapping with the first adjacent member 21 in the Y axis direction); and a pair of second connecting portions 312 which connects end portions of the pair of beam portions 310 to each other. In this embodiment, the oppositely facing member 31 also includes third connecting portions 313 which connect the pair of beam portions 310 to each other between the first connecting portion 311 and the second connecting portions 312.

The pair of beam portions 310 extend along corner portions of the plurality of energy storage devices 10 (the cases 12) arranged in a row in the X axis direction. The first connecting portion 311 extends in the Z axis direction, and has through holes 3111, 3112 at positions corresponding to the connecting portion 2111 and the shaft portion 213 of the first adjacent member 21 (to be more specific, positions overlapping with the connecting portion 2111 and the shaft portion 213 of the first adjacent member 21 in the Y axis direction). The bolt B is made to pass through the through hole 3111, and the bolt B is threadedly engaged with the connecting portion 2111 of the first adjacent member 21. With such a configuration, the oppositely facing member 31 and the first adjacent member 21 are connected to each other. Further, the shaft portion 213 of the first adjacent member 21 is made to pass through the through hole 3112. The second connecting portion 312 extends in the Z axis direction, and is connected to the end member 30. With such a configuration, the end member 30 and the oppositely facing member 31 are connected (joined) to each other. The third connecting portions 313 extend in the Z axis direction at positions where the third connecting portions 313 overlap with the energy storage device 10 in the Y axis direction.

The insulators 4 are made of a material having an insulating property. Each insulator 4 is disposed between the oppositely facing member 31 and the plurality of energy storage devices 10 arranged in a row in the X axis direction. To be more specific, the insulators 4 cover at least regions of the holder 3 which oppositely face the plurality of energy storage devices 10. With such a configuration, the insulators 4 provide insulation between the oppositely facing member 31 and the plurality of energy storage devices 10 arranged in a row in the X axis direction.

The bus bar 5 is a plate-like member which is made of a material having conductivity such as metal. The bus bar 5 includes plural kinds of bus bars. In this embodiment, the bus bar 5 includes: intermediate bus bars 50 each of which connects the external terminals 13 of the adjacent energy storage devices 10 to each other in a conductive manner; and end-portion bus bars 53 each of which connects the external terminal 13 of the energy storage device 10 and the total terminal 71 of the energy storage apparatus 1 to each other in a conductive manner.

The plurality of intermediate bus bars 50 (the number of the intermediate bus bars 50 corresponding to the number of the plurality of energy storage devices 10) are provided to the energy storage apparatus 1. The plurality of intermediate bus bars 50 connect all of the plurality of energy storage devices 10 included in the energy storage apparatus 1 in series (or make all of the plurality of energy storage devices 10 conductive with each other). Further, the plurality of intermediate bus bars 50 include: a first bus bar 51 which makes the external terminals 13 of the energy storage devices 10 disposed adjacently to each other with the first adjacent member 21 interposed therebetween conductive with each other (that is, connecting the energy storage devices 10 to each other while straddling over the first adjacent member 21); and second bus bars 52 each of which makes the external terminals 13 of the energy storage devices 10 disposed adjacently to each other conductive with each other with the third adjacent member 23 interposed therebetween (that is, connecting the energy storage devices 10 to each other while straddling the third adjacent member 23). In this embodiment, the energy storage apparatus 1 includes one first bus bar 51, the plurality of second bus bars 52, and the pair of end portion bus bars 53.

As shown also in FIG. 5 and FIG. 6, the first bus bar 51 is configured to make the external terminal 13 of a predetermined energy storage device 10 (hereinafter also referred to as "first energy storage device 10A") among the plurality of energy storage devices 10 and the external terminal 13 of another energy storage device 10 (hereinafter also referred to "second energy storage device 10B") among the plurality of energy storage devices 10 conductive with each other. In the example of this embodiment, the first energy storage device 10A is an energy storage device which is disposed adjacently to the first adjacent member 21 on one side in the X axis direction (a left side in FIG. 5), and the second energy storage device 10B is an energy storage device which is disposed adjacently to the first adjacent member 21 on the other side in the X axis direction (a right side in FIG. 5). That is, the first bus bar 51 connects the external terminals 13 of the energy storage devices 10A, 10B which are disposed adjacently to each other with the first adjacent member 21 interposed therebetween. The first bus bar 51 connects the external terminal 13 of the first energy storage device 10A and the external terminal 13 of the second energy storage device 10B to each other so as to straddle over the first adjacent member 21 in a state where a gap is formed between the first bus bar 51 and the first adjacent member 21 (that is, in a non-contact state with respect to the first adjacent member 21). The specific number of the first energy storage devices 10A and the second energy storage devices 10B which are made conductive (connected) with each other by the first bus bar 51 is not limited.

The first bus bar 51 includes at least a first member 55 which is connected to the external terminal 13 of the first energy storage device 10A, and a second member 56 which is connected to the external terminal 13 of the second energy storage device 10B. The first member 55 and the second member 56 form a conductive path by being directly or indirectly conductive with each other, and the conductive path has a middle portion thereof formed in a separable or interrupting manner. In this embodiment, the first bus bar 51 forms a conductive path which makes the external terminal 13 of the first energy storage device 10A and the external terminal 13 of the second energy storage device 10B conductive with each other by the first member 55 and the second member 56. In this embodiment, the first bus bar 51 includes the first member 55, and the second member 56 having a portion thereof overlapped with the first member 55. Further, in this embodiment, the first bus bar 51 also includes a third member 57 which overlaps with the first member 55 and the second member 56.

The first member 55 includes: a first connection portion 551 which is connected to the external terminal 13 of the first energy storage device 10A; and a first extension portion 552 which extends from the first connection portion 551. In this embodiment, the first member 55 is connected to the positive electrode external terminal 13 of the first energy storage device 10A and is formed by applying or the like to a rectangular plate-like member.

The first connection portion 551 is a portion expanding in the X-Y plane (a plane including the X axis and the Y axis) direction and having a rectangular shape as viewed in the Z axis direction. The first connection portion 551 has a through hole 551A at a center portion thereof. In this embodiment, the first connection portion 551 is connected to the external terminal 13 by being welded along a peripheral edge of the through hole 551A.

The first extension portion 552 includes: a first conductive portion (first conductive part) 553 which is conductive with the second member 56; and a first route-around portion 554 which is disposed more on a first connection portion 551 side than the first conductive portion 553.

The first conductive portion 553 has a first conductive surface 553A which intersects with the Z axis direction. That is, the first conductive portion 553 is a portion having the first conductive surface 553A in the first extension portion 552. The first conductive portion 553 overlaps with the bus bar support portion 2112 of the first adjacent member 21 in the Z axis direction. In this embodiment, the first conductive portion 553 is a portion expanding in the X-Y plane direction and having a rectangular shape as viewed in the Z axis direction, and has a through hole 553B at a center portion thereof (to be more specific, at a position overlapping in the Z axis direction with a female threaded portion (fixing portion 2113) which opens in the Z axis direction on an end surface of the bus bar support portion 2112 in the projecting direction). In this embodiment, the first conductive surface 553A is a plane orthogonal to the Z axis direction (that is, expanding in the X-Y plane direction while being directed toward the second member 56).

The first route-around portion 554 connects the first connection portion 551 and the first conductive portion 553 to each other. That is, the first route-around portion 554 is disposed at a position closer to the first connection portion 551 than the first conductive portion 553 on the first extension portion 552. The first route-around portion 554 is a bent portion. To be more specific, as shown also in FIG. 7, the first route-around portion 554 is configured such that the whole or a portion of the first route-around portion 554 from the first connection portion 551 to the first conductive portion 553 extends in a route-around manner as viewed in the Y axis direction. In this embodiment, the first route-around portion 554 includes: a first raised portion 5541 which is raised (extends in the Z axis direction) from an end of the first connection portion 551; a second raised portion 5542 which is raised (extends in the Z axis direction) from an end of the first conductive portion 553 in a spaced-apart manner from the first raised portion 5541 in the X axis direction; and a bent portion 5543 which connects a distal end of the first raised portion 5541 and a distal end of the second raised portion 5542 to each other and has a circular arcuate shape as viewed in the Y axis direction.

The second member 56 includes: a second connection portion 561 which is connected to the external terminal 13 of the second energy storage device 10B; and a second extension portion 562 which extends from the second connection portion 561. In this embodiment, the second member 56 is connected to the negative electrode external terminal 13 of the second energy storage device 10B, and is formed by applying bending or the like to a rectangular plate-like member in the same manner as the first member 55.

The second connection portion 561 is a portion expanding in the X-Y plane direction and having a rectangular shape as viewed in the Z axis direction. The second connection portion 561 has a through hole 561A at a center portion thereof. The through hole 561A of the second connection portion 561 is set larger than the through hole 551A of the first connection portion 551. In this embodiment, the second connection portion 561 is connected to the external terminal 13 by being welded along a peripheral edge of the through hole 561A.

The second extension portion 562 includes: a second conductive portion (second conductive part) 563 which is conductive with the first member 55 (to be more specific, the first conductive portion 553); and a second route-around portion (route-around part) 564 which is disposed more on a second connection portion 561 side than the second conductive portion 563.

The second conductive portion 563 has a second conductive surface 563A which is made to overlap with the first conductive surface 553A in a separable manner in a state where the second conductive surface 563A opposedly faces the first conductive surface 553A (see FIG. 6). That is, the second conductive portion 563 is a portion having the second conductive surface 563A in the second extension portion 562. In this embodiment, the second conductive portion 563 is a portion expanding in the X-Y plane direction and having a rectangular shape as viewed in the Z axis direction, and overlaps with the first conductive portion 553 in the Z axis direction. The second conductive portion 563 has the same or substantially the same size as the first conductive portion 553, and has a through hole 563B at a position where the through hole 563B overlaps with the through hole 553B of the first conductive portion 553 and the female threaded portion (fixing portion 2113) of the bus bar support portion 2112 in the Z axis direction. The through hole 563B has the same or substantially the same size as the through hole 553B, and is slightly larger than the female threaded portion (fixing portion 2113) of the bus bar support portion 2112. Further, in this embodiment, the second conductive surface 563A is a flat surface disposed orthogonal to the Z axis direction.

The second route-around portion 564 connects the second connection portion 561 and the second conductive portion 563 to each other. That is, the second route-around portion 564 is disposed at a position closer to the second connection portion 561 than the second conductive portion 563 on the second extension portion 562. The second route-around portion 564 is a bent portion. To be more specific, the second route-around portion 564 is configured such that the whole or a portion of the second route-around portion 564 from the second connection portion 561 to the second conductive portion 563 extends in a route-around manner as viewed in the Y axis direction. In this embodiment, the second route-around portion 564 includes: a first raised portion 5641 which is raised (extends in the Z axis direction) from an end of the second connection portion 561; a second raised portion 5642 which is raised (extends in the Z axis direction) from an end of the second conductive portion 563 in a spaced-apart manner from the first raised portion 5641 in the X axis direction; and a bent portion 5643 which connects a distal end of the first raised portion 5641 and a distal end of the second raised portion 5642 to each other and has a circular arcuate shape as viewed in the Y axis direction.

The first member 55 and the second member 56 having the above-mentioned configuration respectively have a guide portion which guides the insulation plate 8 at the time of inserting the insulation plate (insulation member) 8 (see FIG. 11) described later between the first conductive surface 553A and the second conductive surface 563A. In this embodiment, the guide portion includes: a first guide portion 555 which the first extension portion 552 includes; and a second guide portion 565 which the second extension portion 562 includes.

The first guide portion 555 extends from an end edge of the first conductive surface 553A, and the second guide portion 565 extends from an end edge of the second conductive surface 563A at a position corresponding to the first guide portion 555. A distance between the first guide portion 555 and the second guide portion 565 (a distance in the Z axis direction in the example of this embodiment) is gradually increased as the first guide portion 555 and the second guide portion 565 are away from the first conductive surface 553A and the second conductive surface 563A.

In the first bus bar 51 in this embodiment, the first guide portion 555 is formed of a pair of projecting members 555A which projects from an outer end edge of the first conductive portion 553 in the Y axis direction, and the second guide portion 565 is formed of a pair of projecting members 565A which projects from an outer end edge of the second conductive portion 563 in the Y axis direction. Each pair of projecting members 555A, 565A projects in a spaced-apart manner in the X axis direction. The projecting member 555A of the first guide portion 555 and the projecting member 565A of the second guide portion 565 which correspond to each other (at positions overlapping with each other in the Z axis direction in the example of this embodiment) include opposedly facing surfaces 555B, 565B respectively, wherein the opposedly facing surfaces 555B, 565B extend from the first conductive surface 553A and the second conductive surface 563A and are bent such that a distance between the opposedly facing surfaces 555B, 565B is gradually increased as the opposedly facing surfaces 555B, 565B are away from the first conductive surface 553A and the second conductive surface 563A.

The third member 57 is made to overlap with the first extension portion 552 and the second extension portion 562 from a side opposite to the first adjacent member 21. The third member 57 includes: a third member body 571 which overlaps with the first conductive portion 553 and the second conductive portion 563; and a contact portion 572 which extends from the third member body 571 and is brought into contact with the first adjacent member 21.

The third member body 571 is a plate-like portion expanding in the X-Y plane direction, and has a rectangular profile substantially equal to the profile of the first conductive portion 553 and the second conductive portion 563. The third member body 571 has: a through hole 571A at a position where the through hole 571A overlaps with a female threaded portion (fixing portion 2113) of the bus bar support portion 2112; the through hole 553B of the first conductive portion 553; and the through hole 563B of the second conductive portion 563 in the Z axis direction. The through hole 571A has the same or substantially the same size as the through holes 553B, 563B, and is set slightly larger than a threaded hole of the female threaded portion (fixing portion 2113) of the bus bar support portion 2112.

The contact portion 572 is brought into contact with the first adjacent member 21 (inner surface of the groove 2112A of the bus bar support portion 2112 in the example of this embodiment) in the rotational direction where the center or rotation is a center axis of the female threaded portion (fixing portion 2113) of the bus bar support portion 2112 (the rotational direction of a threaded portion at the time of making the threaded portion such as a bolt threadedly engage with the female threaded portion (the male threaded portion 61 of the mounting member 6 in the example of this embodiment)). To be more specific, the contact portion 572 extends along the groove 2112A (downward in FIG. 5) from a position of the third member body 571 which corresponds to the groove 2112A of the bus bar support portion 2112. A cross-sectional shape of the contact portion 572 along the X-Y plane corresponds to a cross-sectional shape of the groove 2112A along the X-Y plane. In this embodiment, the contact portion 572 extends from both end portions of the third member body 571 in the Y axis direction. That is, the third member 57 has the pair of contact portions 572.

Figure 8:
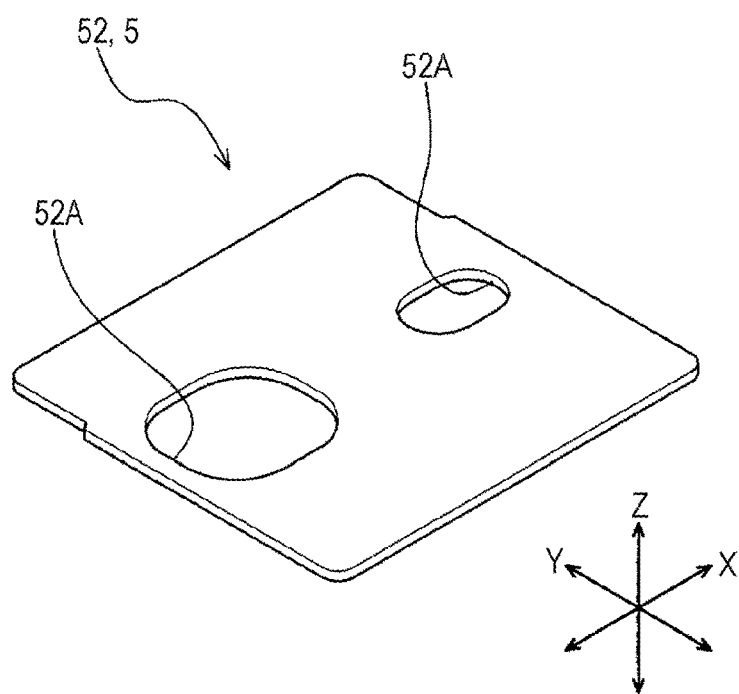
FIG. 8 is a perspective view of a second bus bar.

As shown in FIG. 1, FIG. 2 and FIG. 8, the second bus bar 52 has an approximately rectangular plate shape extending in the X axis direction, and has two through holes 52A at both end portions thereof in the X axis direction. These two through holes 52A differ from each other in size. In the energy storage apparatus 1 of this embodiment, a portion (end portion) of the second bus bar 52 in which the larger through hole 52A is formed is connected to the negative electrode external terminal 13, and a portion (end portion) in which the smaller through hole 52A is formed is connected to the positive electrode external terminal 13.

Figure 9:
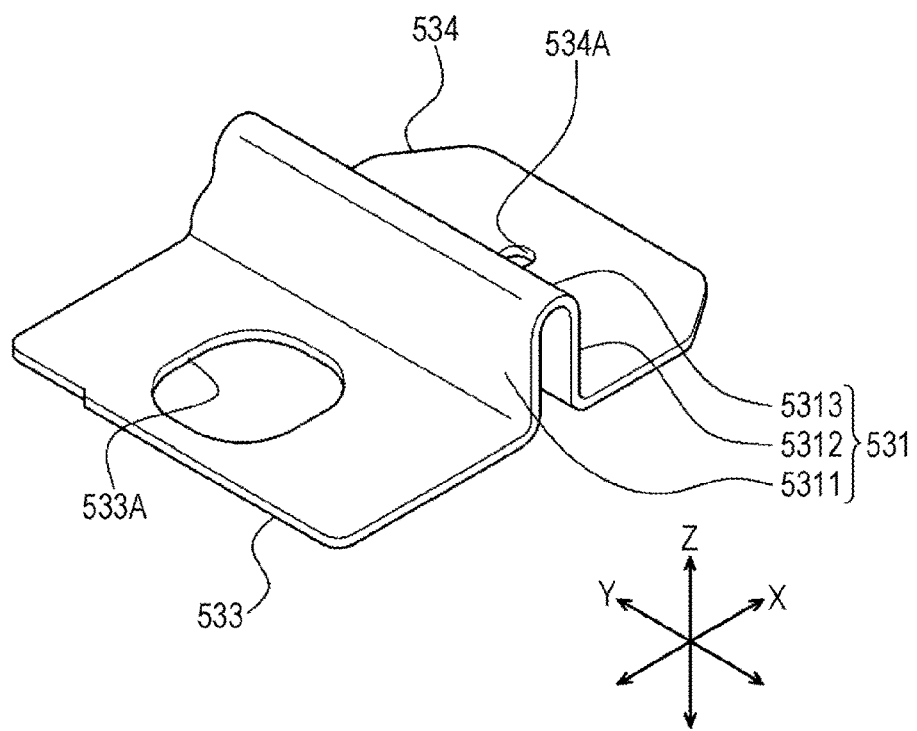
FIG. 9 is a perspective view of an end portion bus bar.

As shown in FIG. 1, FIG. 2 and FIG. 9, one of the pair of end portion bus bars 53 is provided for making one terminal base 7 (the total terminal 71) and the external terminal 13 of the energy storage device 10 disposed on an end portion of a unit of the plurality of energy storage devices 10 connected in series on one electrode side (for example, positive electrode side) conductive with each other. The other of the pair of end portion bus bars 53 is provided for making the other terminal base 7 (the total terminal 71) and the external terminal 13 of the energy storage device 10 disposed on an end portion of the unit of the plurality of energy storage devices 10 connected in series on the other electrode side (for example, the negative electrode side) conductive with each other.

In this embodiment, the end portion bus bar 53 is a plate-like member extending in the X axis direction, and the end portion bus bar 53 has a bent portion at an intermediate position in the X axis direction. To be more specific, the end portion bus bar 53 has a third route-around portion 531 which extends in a route-around manner as viewed in the Y axis direction. To be more specific, the end portion bus bar 53 has: a third connection portion 533 which is connected to the terminal base 7; a fourth connection portion 534 which is connected to the external terminal 13 of the energy storage device 10; and a third route-around portion 531 which connects the third connection portion 533 and the fourth connection portion 534 to each other. The third connection portion 533 and the fourth connection portion 534 are respectively formed of a rectangular plate-like portion expanding in the X-Y plane direction. The third connection portion 533 has a through hole 533A, and the fourth connection portion 534 has a through hole 534A. The through holes 533A, 534A differ from each other in size. In this embodiment, the third route-around portion 531 has substantially the same configuration as the first route-around portion 554 and the second route-around portion 564 of the first bus bar 51. That is, the third route-around portion 531 includes: a third raised portion 5311 which is raised (extends in the Z axis direction) from an end of the third connection portion 533; a fourth raised portion 5312 which is raised (extends in the Z axis direction) from an end of the fourth connection portion 534 in a spaced-apart manner from the third raised portion 5311 in the X axis direction; and a bent portion 5313 which connects a distal end of the third raised portion 5311 and a distal end of the fourth raised portion 5312 to each other, and has a circular arc shape as viewed in the Y axis direction.

The mounting member 6 is removably mounted on the first adjacent member 21. To be more specific, as shown in FIG. 5 and FIG. 6, the mounting member 6 has a male threaded portion 61 which is threaded into the fixing portion (female threaded portion) 2113 of the first adjacent member 21 in a state where the male threaded portion 61 penetrates the first extension portion 552, the second extension portion 562 and the third member body 571 which are made to overlap with each other in the Z axis direction from a side of the third member 57.

In this embodiment, the mounting member 6 is a bolt. That is, the mounting member 6 has: the male threaded portion 61 which extends in the Z axis direction; and a head portion 62 which is formed on an end portion of the male threaded portion 61 and has a size larger than the male threaded portion 61 in the X-Y plane direction. Further, since the male threaded portion 61 is threaded into the fixing portion 2113 of the bus bar support portion 2112 in a state where the male threaded portion 61 is made to pass through the through hole 571A of the third member body 571, the through hole 563B of the second conductive portion 563 and the through hole 553B of the first conductive portion 553, the head portion 62 presses the third member body 571, the second conductive portion 563 and the first conductive portion 553 toward the bus bar support portion 2112.

Figure 10:
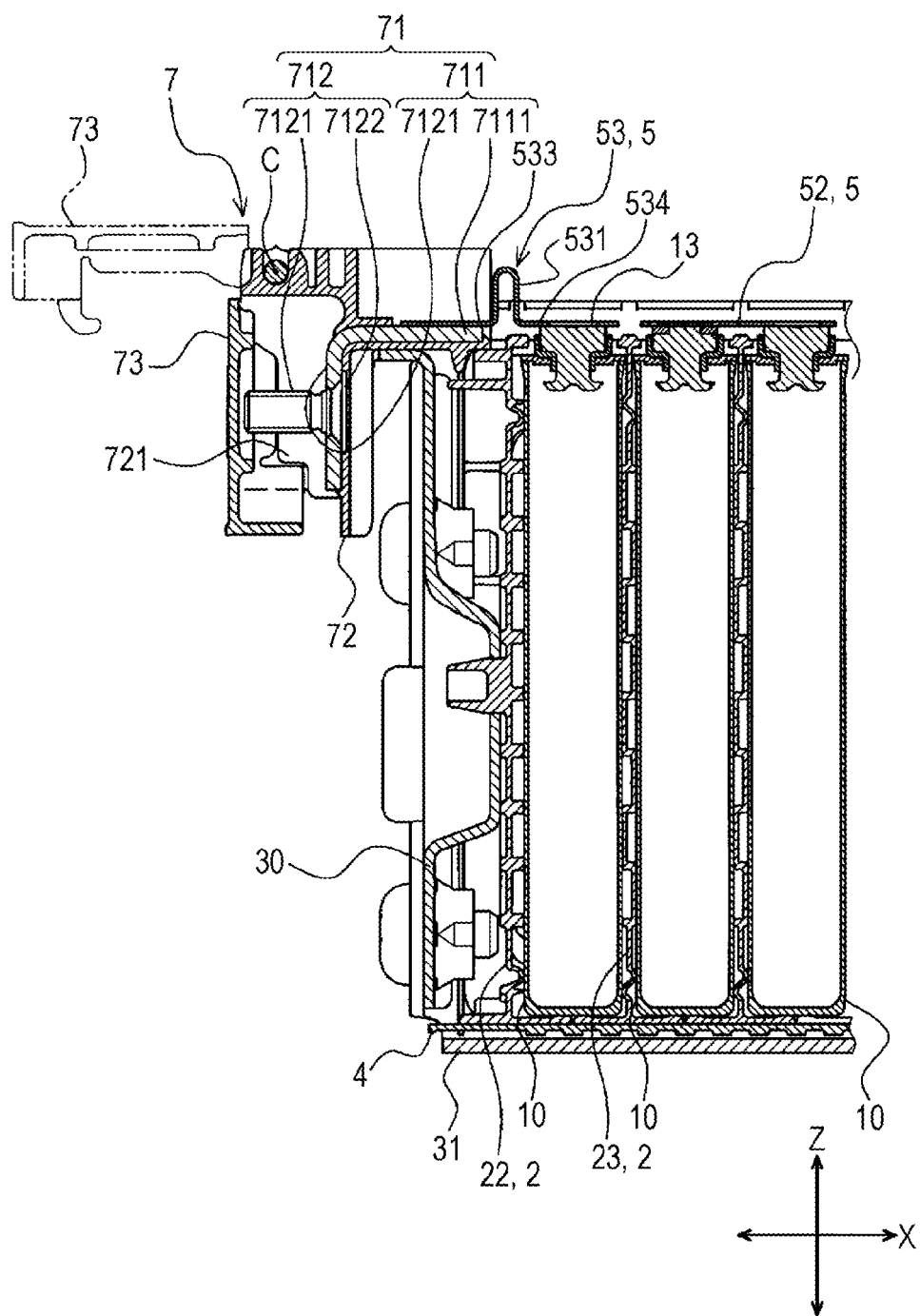
FIG. 10 is a cross-sectional view of the energy storage apparatus taken along a line X-X in FIG. 1, and is a cross-sectional view of a terminal base and parts around the terminal base.

As shown in FIG. 1, FIG. 2 and FIG. 10, the terminal base 7 includes: the total terminal 71 which is connected to external equipment, another energy storage apparatus 1 or the like; and a base portion 72 which is mounted on the holder 3 and supports the total terminal 71. In this embodiment, the terminal base 7 also includes a terminal cover 73 which covers the total terminal 71 so as to prevent the total terminal 71 from being brought into contact with a person, other members or the like when the energy storage apparatus 1 is not in use or the like. In this embodiment, the total terminal 71 includes: a plate-like member 711 to which the end portion bus bar 53 (to be more specific, the third connection portion 533) is connected (fixedly mounted); and a screw member 712 which is used for fixing a terminal of external equipment or the like.

The plate-like member 711 is made of a material having conductivity. In this embodiment, the plate-like member 711 is a member having an L shape as viewed in the Y axis direction, that is, is a plate-like member which is bent at an intermediate position thereof. To be more specific, the plate-like member 711 includes: a first portion 7111 which extends in a predetermined direction (in the X axis direction in this exemplified embodiment) and is fixed to the end member 30 by way of the base portion 72; and a second portion 7112 which extends from the first portion 7111 in a direction which intersects with the predetermined direction (in the Z axis direction in this exemplified embodiment).

The screw member 712 projects from the plate-like member 711 (from the second portion 7112 in this exemplified embodiment). To be more specific, the screw member 712 includes: a male screw portion 7121 which extends in the X axis direction from the second portion 7112; and a head portion 7122 which expands in the Y-Z plane direction on one end of the male screw member 7121.

The base portion 72 is fixed to the end member 30, and supports the plate-like member 711 on a side where the end member 30 is positioned with respect to the plate-like member 711. The base portion 72 has a pair of side wall portions 721 which opposedly faces each other such that the male screw member 7121 (the screw member 712) which penetrates the second portion 7112 of the plate-like member 711 is positioned between the pair of side wall portions 721. The terminal cover 73 is mounted on end portions of the pair of side wall portions 721 in the Z axis direction (upper end portions in FIG. 10) in a rotatable manner using a predetermined axis C extending in the Y axis direction as the center of rotation. In a state where the terminal cover 73 is closed (a state where the terminal cover 73 extends between end edges of the pair of side wall portions 721), the total terminal 71 is surrounded by the pair of side wall portions 721 and the terminal cover 73 (to be more specific, the second portion 7112 and the screw member 712 of the plate-like member 711 are surrounded). On the other hand, in a state where the terminal cover 73 is opened (a state where the terminal cover 73 is rotated using the predetermined axis C as the center of rotation: see FIG. 2, a double dashed chain line in FIG. 10), a distal end side of the screw member 712 is brought into an open state.

In the energy storage apparatus 1 having the above-mentioned configuration, an insulation plate (insulation member) is mounted on the energy storage apparatus 1 so as to prevent inputting and outputting of electricity to and from the total terminal 71 when inputting and outputting of electricity is unnecessary, that is, at the time of transporting the energy storage apparatus 1 or at the time of performing maintenance of equipment or the like on which the energy storage apparatus 1 is mounted.

Figure 11:
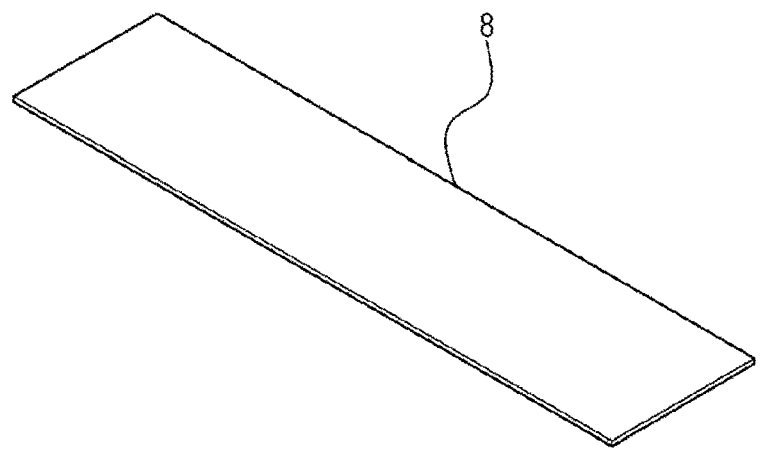
FIG. 11 is a perspective view of an insulation plate.
Figure 11:
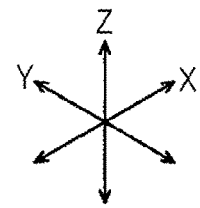

The insulation plate has insulation property, and has a shape which allows the insulation plate to be inserted between conductive surfaces, that is, between the first conductive surface 553A of the first conductive portion 553 and the second conductive surface 563A of the second conductive portion 563. As shown in FIG. 11, the insulation plate 8 of this embodiment is a plate-like member.

Figure 12:
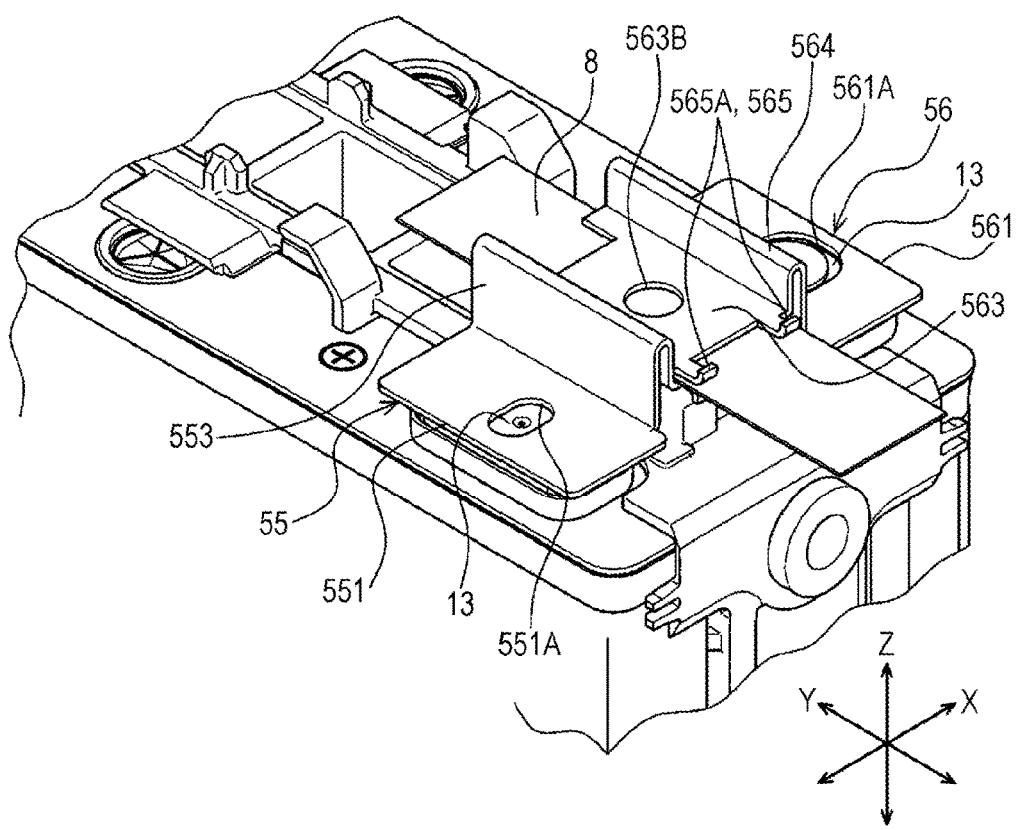
FIG. 12 is an enlarged perspective view of the first bus bar in a state where the insulation plate is inserted between the first member and the second member in a state where the mounting member and the third member are removed from the first bus bar and parts around the first bus bar.

As shown in FIG. 12, the insulation plate 8 is inserted between the first conductive surface 553A of the first member 55 and the second conductive surface 563A of the second member 56 in a state where the mounting member 6 and the third member 57 are removed. With such a configuration, an electric path which connects the pair of total terminals 71 is shut off at a position corresponding to the first bus bar 51 and hence, a state is brought about where inputting and outputting of electricity from the pair of total terminals 71 cannot be performed in the energy storage apparatus 1.

On the other hand, in using the energy storage apparatus 1, the insulation plate 8 is pulled out from between the first conductive surface 553A and the second conductive surface 563A, and the male threaded portion 61 of the mounting member 6 is threaded into the fixing portion 2113 of the bus bar support portion 2112 in a state where the third member 57 is made to overlap with the first conductive portion 553 and the second conductive portion 563 (see FIG. 5). With such a configuration, the first member 55 and the second member 56 are made conductive with each other thus enabling inputting and outputting of electricity to and from the pair of total terminals 71 in the energy storage apparatus 1.

According to the energy storage apparatus 1 described above, the first member 55 and the second member 56 are respectively connected to the corresponding external terminals 13 (by welding in the example of this embodiment). In this embodiment, however, the first conductive surface 553A and the second conductive surface 563A are brought into a state where the first conductive surface 553A and the second conductive surface 563A are made to overlap with each other in a separable manner. Accordingly, by separating the first conductive surface 553A and the second conductive surface 563A from each other, it is possible to provide a state where electricity cannot be inputted to or outputted from the energy storage apparatus 1.

In the energy storage apparatus 1 of this embodiment, the first conductive surface 553A and the second conductive surface 563A are respectively formed of a flat surface disposed orthogonal to the Z axis direction (including the X axis). Accordingly, even when an error in manufacture or the like occurs with respect to a distance (a distance in the X axis direction) between the energy storage devices 10 where the external terminals 13 are connected to each other by the first bus bar 51, the energy storage devices 10 can be moved relative to each other in the X axis direction in a state where the first conductive surface 553A and the second conductive surface 563A are brought into surface contact with each other. Accordingly, even when the above-mentioned error in manufacture or the like occurs, it is possible to make the first conductive surface 553A and the second conductive surface 563A conductive with each other (face contact) with certainty without generating a stress caused by forcibly bringing the first conductive surface 553A and the second conductive surface 563A into surface contact with each other.

In the energy storage apparatus 1 of this embodiment, the first member 55 includes the first route-around portion (bent portion) 554, and the second member 56 includes the second route-around portion (bent portion) 564. Accordingly, even when a distance in the X axis direction between the energy storage devices 10 whose external terminals 13 are connected to each other by the first bus bar 51 changes, the first route-around portion 554 and the second route-around portion 564 expand or narrow (to be more specific, the bent portions 5543, 5643 extend or shrink (curvatures of the bent portions 5543, 5643 are decreased or increased) so that the first raised portions 5541, 5641 and the second raised portions 5542, 5642 expand or narrow). With such a configuration, it is possible to suppress the concentration of a stress caused by a change in the distance on the portions of the first member 55 and the second member 56 which are connected with the external terminals 13 (the first connection portion 551, the second connection portion 561, and the surroundings of the first connection portion 551 and the second connection portion 561). Accordingly, it is possible to prevent the occurrence of damage on the first member 55 and the second member 56 caused by a change in the distance.

In the energy storage apparatus 1 of this embodiment, the mounting member 6 presses the first conductive portion 553 and the second conductive portion 563 to the first adjacent member 21 (the bus bar support portion 2112 in the example of this embodiment). Accordingly, even when the first conductive surface 553A and the second conductive surface 563A are pressed to each other so that vibrations or the like are applied to the energy storage apparatus 1, it is possible to maintain a conductive state between the first conductive portion 553 and the second conductive portion 563 with certainty.

In the energy storage apparatus 1 of this embodiment, the third member 57 which sandwiches the first member 55 and the second member 56 in cooperation with the first adjacent member 21 has the contact portion 572 which is brought into contact with the first adjacent member 21 in the rotational direction of the male threaded portion 61 of the mounting member 6 (to be more specific, the inner surface of the groove 2112A of the bus bar support portion 2112). Accordingly, it is possible to prevent a torque which is generated at the time of making the male threaded portion 61 threadedly engage with the fixing portion (female threaded portion) 2113 of the bus bar support portion 2112 from being transmitted to the first member 55 and the second member 56 by the third member 57. Accordingly, it is possible to prevent a stress generated by such a torque from being applied to the first connection portion 551 and the second connection portion 561 respectively connected to the external terminals 13.

In the energy storage apparatus 1 of this embodiment, the male threaded portion 61 of the mounting member 6 penetrates the first conductive portion 553, the second conductive portion 563, and the third member 57 (to be more specific, the third member body 571). Accordingly, the first conductive portion 553 and the second conductive portion 563 which are made to overlap with each other in a state where the first conductive surface 553A and the second conductive surface 563A are brought into surface contact with each other are fastened by the mounting member 6 disposed between the first adjacent member 21 and the third member 57. With such a configuration, the first conductive portion 553 (the first conductive surface 553A) and the second conductive portion 563 (the second conductive surface 563A) are further firmly stuck to each other.

In the energy storage apparatus 1 of this embodiment, the insulation plate 8 is used. The insulation plate 8 is inserted between the first conductive surface 553A and the second conductive surface 563A in such a manner that the insulation plate 8 can be pulled out from between the first conductive surface 553A and the second conductive surface 563A. By inserting the insulation plate 8 between the first conductive surface 553A and the second conductive surface 563A or by pulling out the insulation plate 8 from between the first conductive surface 553A and the second conductive surface 563A, it is possible to change a state of the energy storage apparatus 1 between a state where electricity can be inputted to or outputted from the total terminal 71 and a state where electricity can be neither inputted to nor outputted from the total terminal 71. That is, when the insulation plate 8 is inserted between the first conductive surface 553A and the second conductive surface 563A, the conduction between the first conductive portion 553 and the second conductive portion 563 is shut off so that a state is brought about where electricity cannot be inputted to or outputted from the energy storage apparatus 1. On the other hand, when the insulation plate 8 is pulled out, the first conductive portion 553 and the second conductive portion 563 are made conductive with each other (the first conductive surface 553A and the second conductive surface 563A are brought into a face contact with each other) so that a state is brought about where electricity can be inputted to or outputted from the energy storage apparatus 1.

In the energy storage apparatus 1 of this embodiment, in the first bus bar 51, the distance between the first guide portion 555 and the second guide portion 565 is increased as the first guide portion 555 and the second guide portion 565 are away from the first conductive surface 553A and the second conductive surface 563A. That is, as the first guide portion 555 and the second guide portion 565 approach to a position where the first conductive surface 553A and the second conductive surface 563A overlap with each other, the distance between the first guide portion 555 and the second guide portion 565 is decreased. Accordingly, in an operation of inserting the insulation plate 8 between the first conductive surface 553A and the second conductive surface 563A, the insulation plate 8 is guided by the first guide portion 555 and the second guide portion 565. Accordingly, the insulation plate 8 can be easily inserted between the first conductive surface 553A and the second conductive surface 563A.

It is needless to say that the energy storage apparatus and the insulation member of the present invention are not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the energy storage apparatus 1 of the above-mentioned embodiment, by bringing the first member 55 and the second member 56 of the first bus bar 51 into contact with each other or by separating the first member 55 and the second member 56 from each other, a state of the energy storage apparatus 1 is changed between a state where electricity can be inputted to or outputted from the total terminal 71 and a state where electricity can be neither inputted to nor outputted from the total terminal 71. However, the present invention is not limited to such a configuration. For example, the energy storage apparatus 1 may be configured such that the end portion bus bar 53 includes a plurality of members, and a state of the energy storage apparatus 1 is changed between a state where electricity can be inputted to or outputted from the total terminal 71 and a state where electricity can be neither inputted to nor outputted from the total terminal 71 due to contacting and separation of the plurality of members.

Figure 13:
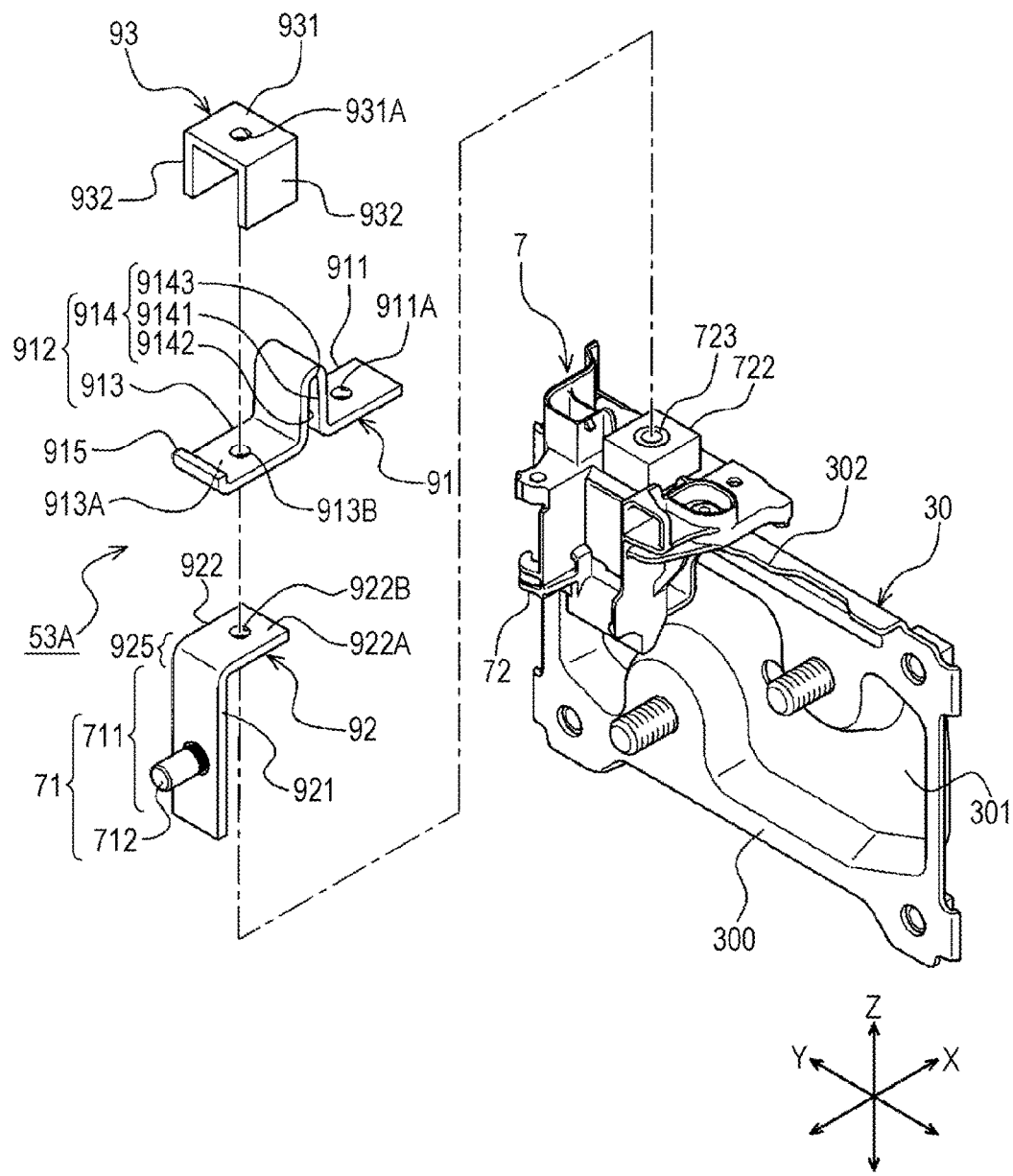
FIG. 13 is an exploded perspective view of a terminal base of an energy storage apparatus according to another embodiment and parts around the terminal base.
Figure 14:
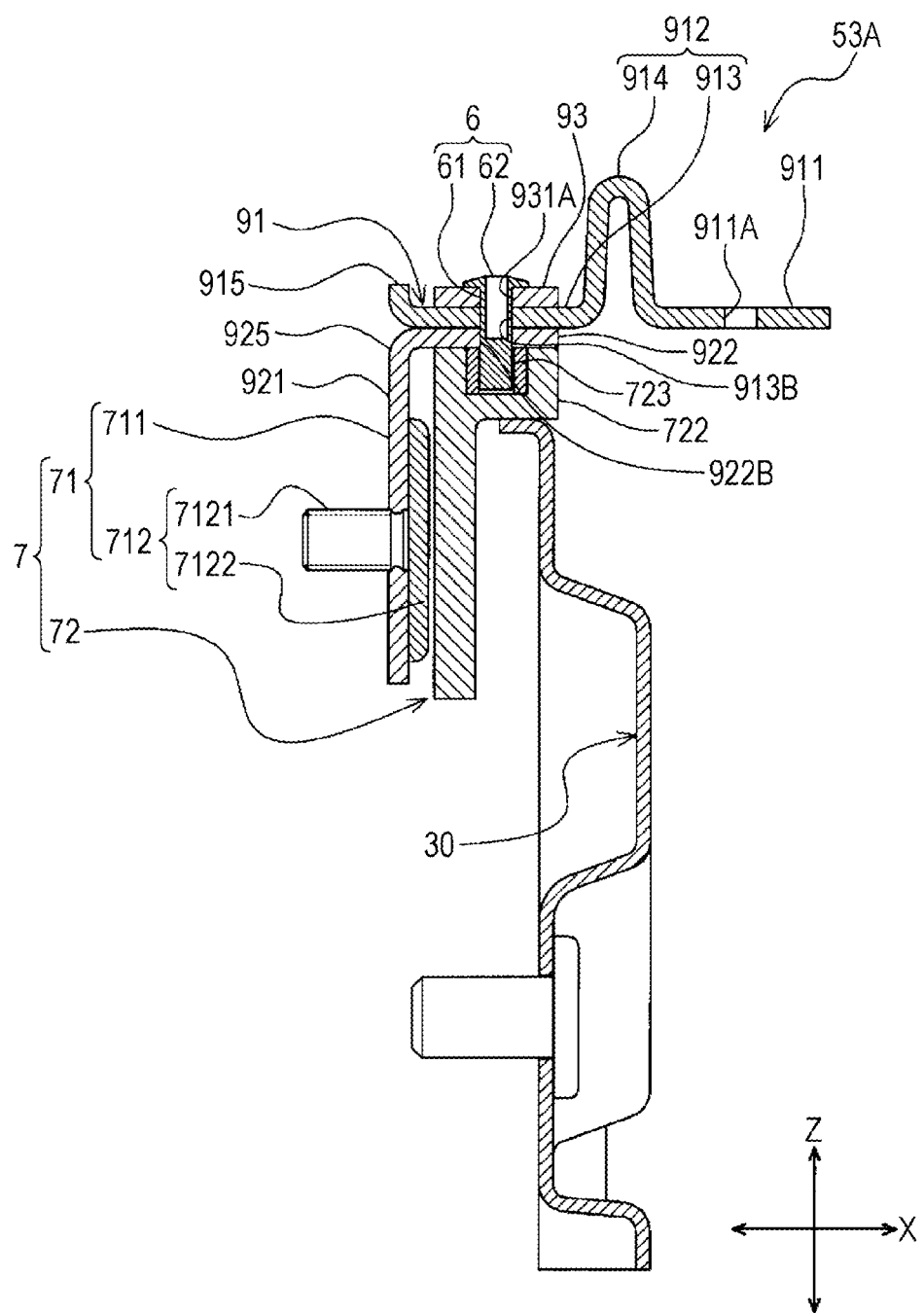
FIG. 14 is an enlarged cross-sectional view of the terminal base and parts around the terminal base.

To be more specific, as shown in FIG. 13 and FIG. 14, the end portion bus bar 53A includes: a first member 91 having a first connection portion 911 connected to the external terminal 13 and a first extension portion 912 extending from the first connection portion 911; and a second member 92 having a second connection portion 921 connected to the total terminal 71 and a second extension portion 922 extending from the second connection portion 921. The first extension portion 912 has a first conductive surface 913A which intersects with the Z axis direction, and the second extension portion 922 has a second conductive surface 922A which is made to overlap with the first conductive surface 913A in a separable manner in a state where the second conductive surface 922A opposedly faces the first conductive surface 913A. Further detailed configuration is described hereinafter.

The base portion 72 of the terminal base 7 has a bus bar support portion 722 which projects from an end surface of the base portion 72 on an end portion bus bar 53 side in the Z axis direction.

The bus bar support portion 722 is a portion having a rectangular parallelepiped shape which is disposed at a position where the bus bar support portion 722 overlaps, in the Z axis direction, with the end portion bus bar 53 which makes the total terminal 71 and the external terminal 13 of the energy storage device 10 conductive with each other. The bus bar support portion 722 includes a fixing portion 723 to which the end portion bus bar 53 is fixed. In this embodiment, the fixing portion 723 is a female threaded portion. To be more specific, the fixing portion 723 is a female threaded portion which opens in the Z axis direction at the end surface of the bus bar support portion 722 in a projecting direction. In this embodiment, the fixing portion 723 is a nut.

The end portion bus bar 53A includes: a first member 91 which is connected to the external terminal 13 of the energy storage device 10 disposed adjacently to the end member 30; and a second member 92 which is connected to the total terminal 71 and has a portion which overlaps with the first member 91. The end portion bus bar 53A also includes a third member 93 which is made to overlap with the first member 91 and the second member 92.

The first member 91 is a rectangular plate-like member expanding in the X-Y plane direction. A size of the first member 91 in the Y axis direction corresponds to a size of the bus bar support portion 722 in the Y axis direction. The first member 91 includes a first connection portion 911 which is connected to the external terminal 13 of the energy storage device 10, and a first extension portion 912 which extends from the first connection portion 911.

The first connection portion 911 has a through hole 911A. The first connection portion 911 is connected to the external terminal 13 by being welded along a peripheral edge of the through hole 911A.

The first extension portion 912 includes: a first conductive portion 913 which is conductive with the second member 92; and a third route-around portion (route-around portion) 914 which is disposed more on a first connection portion 911 side than the first conductive portion 913.

The first conductive portion 913 has a first conductive surface 913A which intersects with the Z axis direction. That is, the first conductive portion 913 is a portion having the first conductive surface 913A in the first extension portion 912. The first conductive portion 913 overlaps with the bus bar support portion 722 of the end member 30 in the Z axis direction. In this embodiment, the first conductive portion 913 has a through hole 913B at a position overlapping, in the Z axis direction, with the female threaded portion (the fixing portion 723) which opens in the Z axis direction on an end surface of the bus bar support portion 722 in the projecting direction. The first conductive surface 913A is a flat surface orthogonal to the Z axis direction (that is, expanding in the X-Y plane direction while being directed toward the second member 92).

The third route-around portion 914 connects the first connection portion 911 and the first conductive portion 913 to each other. That is, the third route-around portion 914 is disposed at a position closer to the first connection portion 911 than the first conductive portion 913 on the first extension portion 912. The third route-around portion 914 is a bent portion. To be more specific, the third route-around portion 914 is configured such that the whole or a portion of the third route-around portion 914 from the first connection portion 911 to the first conductive portion 913 extends in a route-around manner as viewed in the X axis direction. The third route-around portion 914 has the same configuration as the third route-around portion 531 of the end portion bus bar 53 in the above-mentioned embodiment. That is, the third route-around portion 914 includes: a third raised portion 9141 which is raised (extends in the Z axis direction) from an end of the first connection portion 911; a fourth raised portion 9142 which is raised (extends in the Z axis direction) from an end of the first conductive portion 913 in a spaced-apart manner from the third raised portion 9141 in the X axis direction; and a bent portion 9143 which connects a distal end of the third raised portion 9141 and a distal end of the fourth raised portion 9142 to each other and has a circular arcuate shape as viewed in the Y axis direction.

The second member 92 is a rectangular plate-like member, and includes: a second connection portion 921 which is connected to the total terminal 71; and a second extension portion 922 which extends from the second connection portion 921. A size of the second member 92 in the Y axis direction corresponds to a size of the bus bar support portion 722 in the Y axis direction. The second member 92 is connected to the total terminal 71 by being formed integrally with the total terminal 71.

The second extension portion 922 has a second conductive surface 922A which overlaps with the first conductive surface 913A in a separable manner in a state where the second conductive surface 922A opposedly faces the first conductive surface 913A. In this embodiment, the second extension portion 922 overlaps with the first conductive portion 913 in the Z axis direction. The second extension portion 922 has a through hole 922B at a position where the second extension portion 922 overlaps with the through hole 913B of the first conductive portion 913 and the female threaded portion (fixing portion 723) of the bus bar support portion 722 in the Z axis direction. The through hole 922B has the same or substantially the same size as the through hole 913B, and is slightly larger than the female threaded portion (fixing portion 723) of the bus bar support portion 722. Further, the second conductive surface 922A is a flat surface orthogonal to the Z axis direction.

The first member 91 and the second member 92 having the above-mentioned configuration respectively have a guide portion which guides the insulation plate (insulation member) 8 (see FIG. 11) at the time of inserting the insulation plate 8 between the first conductive surface 913A and the second conductive surface 922A. The guide portion includes: a first guide portion 915 which the first extension portion 912 includes; and a second guide portion 925 which the second extension portion 922 includes.

The first guide portion 915 extends from an end edge of the first conductive surface 913A, and the second guide portion 925 extends from an end edge of the second conductive surface 922A at a position corresponding to the first guide portion 915. A distance between the first guide portion 915 and the second guide portion 925 is gradually increased as the first guide portion 915 and the second guide portion 925 are away from the first conductive surface 913A and the second conductive surface 922A.

The third member 93 is made to overlap with the first extension portion 912 and the second extension portion 922 from a side opposite to the base portion 72. The third member 93 includes: a third member body 931 which overlaps with the first conductive portion 913 and the second extension portion 922; and a contact portion 932 which extends from the third member body 931 and is brought into contact with the base portion 72 which is fixed to the end member 30.

The third member body 931 is a plate-like portion expanding in the X-Y plane direction. A size of the third member body 931 in the Y axis direction corresponds to a size of the first conductive portion 913 and a size of the second extension portion 922 in the Y axis direction. The third member body 931 has a through hole 931A at a position where through hole 931A overlaps with the female threaded portion (fixing portion 723) of the bus bar support portion 722, the through hole 913B of the first conductive portion 913, and the through hole 922B of the second extension portion 922 in the Z axis direction. The through hole 931A has the same or substantially the same size as the through holes 913B, 922B, and is slightly larger than a threaded hole formed in the female threaded portion (fixing portion 723) of the bus bar support portion 722.

The contact portion 932 is brought into contact with the base portion 72 (a side surface of the bus bar support portion 722 in the Y axis direction in the example shown in FIG. 13 and FIG. 14) in the rotational direction where the center of rotation is a center axis of the female threaded portion (fixing portion 723) of the bus bar support portion 722. To be more specific, the contact portion 932 extends from the third member body 931 at a position corresponding to the side surface of the bus bar support portion 722 along the side surface (downward in FIG. 13). The contact portion 932 extends from both end portions of the third member body 931 in the Y axis direction respectively.

As described above, the plate-like member 711 of the total terminal 71 is integrally formed with the second member 92. That is, in a rectangular plate member which is bent at an intermediate position thereof as viewed in the Y axis direction, a portion expanding in the X-Y plane direction forms the second member 92, and a portion expanding in the Y-Z plane direction forms the plate-like member 711.

Also in the above-mentioned configuration, the first member 91 is connected to the external terminal 13, and the second member 92 is connected to the total terminal 71. However, the first conductive surface 913A and the second conductive surface 922A are made to overlap with each other in a separable manner and hence, by separating the first conductive surface 913A and the second conductive surface 922A from each other, it is possible to bring the energy storage apparatus 1 into a state where electricity cannot be inputted to or outputted from the energy storage apparatus 1. Further, various advantageous effects acquired by the energy storage apparatus 1 of the above-mentioned embodiment can be acquired also by the energy storage apparatus having such a configuration (the energy storage apparatus where the end portion bus bar 53 is formed of the plurality of members). Further, also in the terminal base 7 of the energy storage apparatus 1, by removing the mounting member 6 and the third member 93, the insulation plate 8 can be inserted between the first conductive surface 913A and the second conductive surface 922A in a state where the insulation plate 8 can be pulled out from between the first conductive surface 913A and the second conductive surface 922A.

Figure 15:
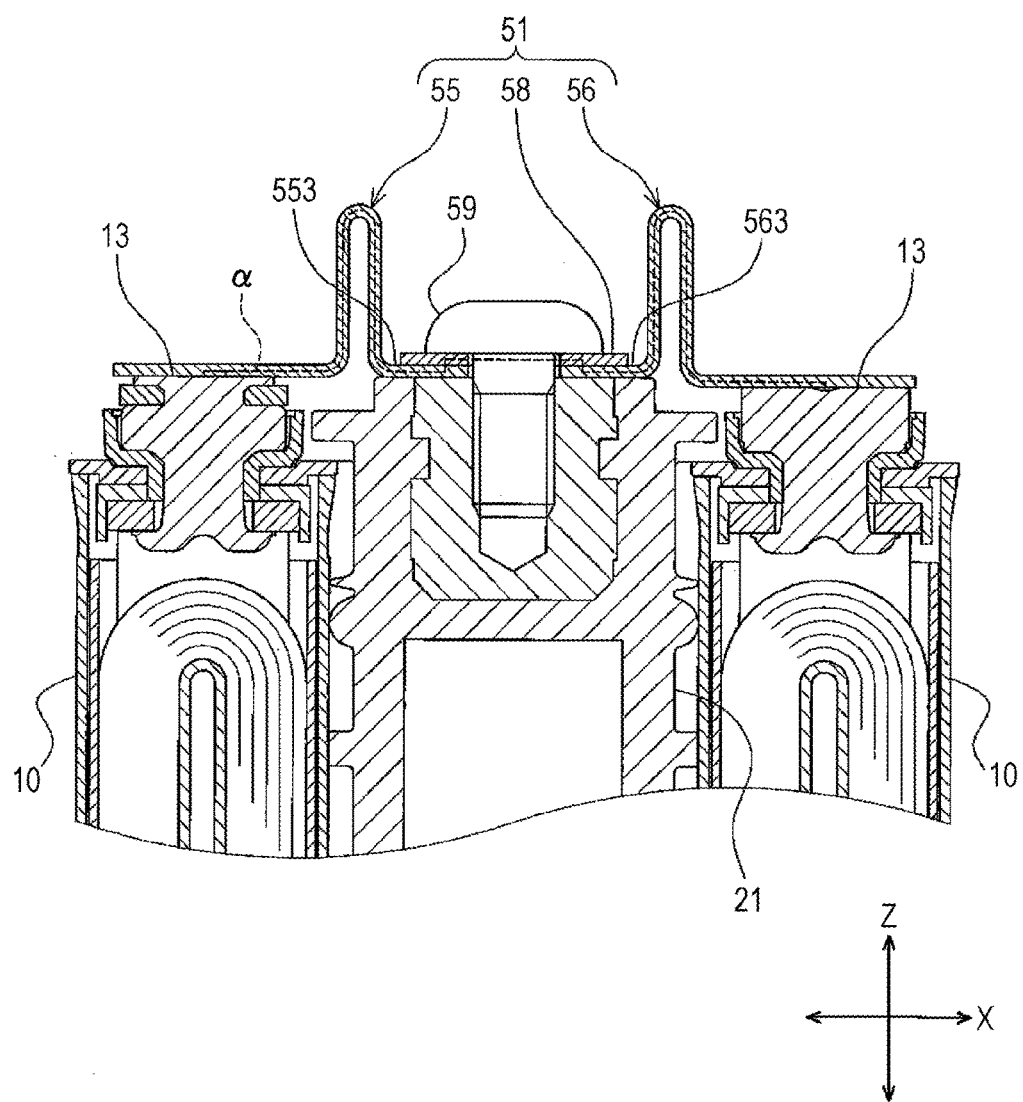
FIG. 15 is a view for describing a first bus bar according to another embodiment.

In the above-mentioned embodiment, the first bus bar 51 is formed of two members. That is, the first bus bar 51 is formed of the first member 55 and the second member 56. However, the present invention is not limited to such a configuration. For example, as shown in FIG. 15, the first bus bar 51 may be configured to form a conductive path α which makes external terminals 13 of the different energy storage devices 10 conductive with each other using three or more members including a first member 55 and a second member 56. To be more specific, the first bus bar 51 may include the first member 55, the second member 56, and a connection member 58 which connects the first member 55 and the second member 56 to each other in a conductive manner. In the example shown in FIG. 15, the connection member 58 is a rectangular plate-like member elongated in the first direction and having conductivity. The connection member 58 is fixed to the first adjacent member 21 by a fastening member (or a fixing member) 59 such as a bolt such that the first conductive portion 553 of the first member 55 and the second conductive portion 563 of the second member 56 are sandwiched between both ends of the connection member 58 in the longitudinal direction (first direction) and the first adjacent member 21 respectively. In the example shown in FIG. 15, the fastening member 59 penetrates a region (portion) of the connection member 58 which is disposed between the connection member 58 and the first adjacent member 21 and where the first conductive portion 533 and the second conductive portion 563 do not exist. However, as show in FIG. 16, a configuration may be adopted where fastening members 59 penetrate a region of a connection member 58 where the connection member 58 and a first conductive portion 553 overlap with each other and a region of the connection member 58 where the connection member 58 and a second conductive portion 563 overlap with each other respectively.

Figure 16:
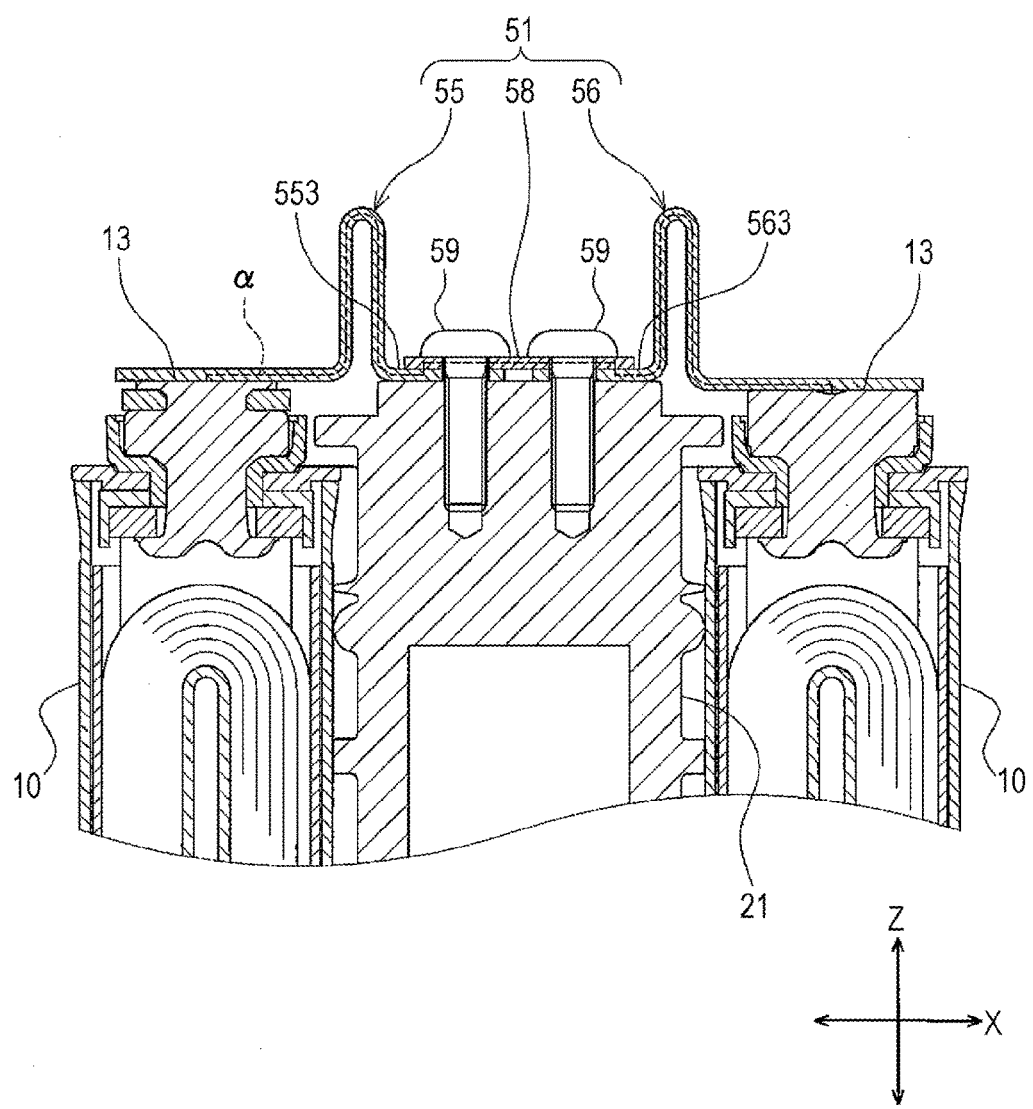
FIG. 16 is a view for describing a first bus bar according to another embodiment.
Figure 17:
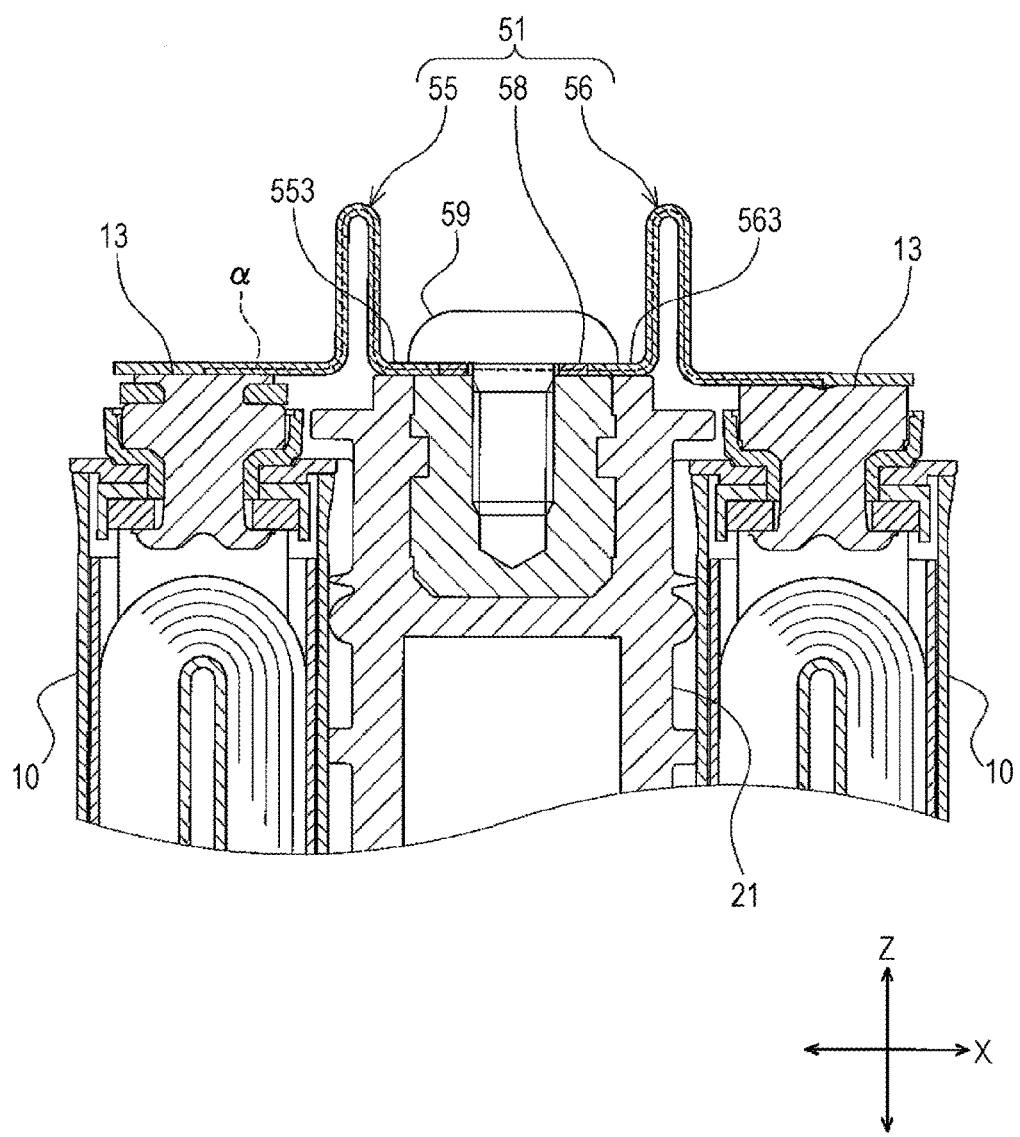
FIG. 17 is a view for describing a first bus bar according to another embodiment.

In the examples shown in FIG. 15 and FIG. 16, the connection member 58 and the first member 55 are made conductive with each other by being made to overlap with each other in the thickness direction, and the connection member 58 and the second member 56 are also made conductive with each other by being made to overlap with each other in the thickness direction. However, the present invention is not limited to such a configuration. As shown in FIG. 17, the connection member 58 and the first member 55 may be made conductive with each other by bringing an end portion of the connection member 58 and an end portion of the first member 55 into contact with each other (a so-called butted state), and the connection member 58 and the second member 56 may be made conductive with each other by bringing an end portion of the connection member 58 and an end portion of the second member 56 into contact with each other. That is, it is sufficient that the connection member 58, the first member 55 and the second member 56 be brought into contact with each other in a conductive manner.

For example, the energy storage apparatus 1 may adopt the configuration where the connection member 58 is eliminated from the configuration shown in FIG. 17. That is, the energy storage apparatus 1 may be configured such that an end portion of a first member 55 and an end portion of a second member 56 are fixed to a first adjacent member 21 by a member having conductivity such as a fastening member 59, and the first member 55 and the second member 56 are made conductive with each other by the member having conductivity.

Further, in the examples shown in FIG. 15 to FIG. 17, the connection member 58 is a single member. However, the connection member 58 may be formed of a plurality of members (members having conductivity).

In the energy storage apparatus 1 of this embodiment, the first bus bar 51 has the first route-around portion 554 and the second route-around portion 564. However, the present invention is not limited to such a configuration. The first bus bar 51 may have no route-around portion, or may have only either one of the first route-around portion 554 or the second route-around portion 564.

Figure 18:
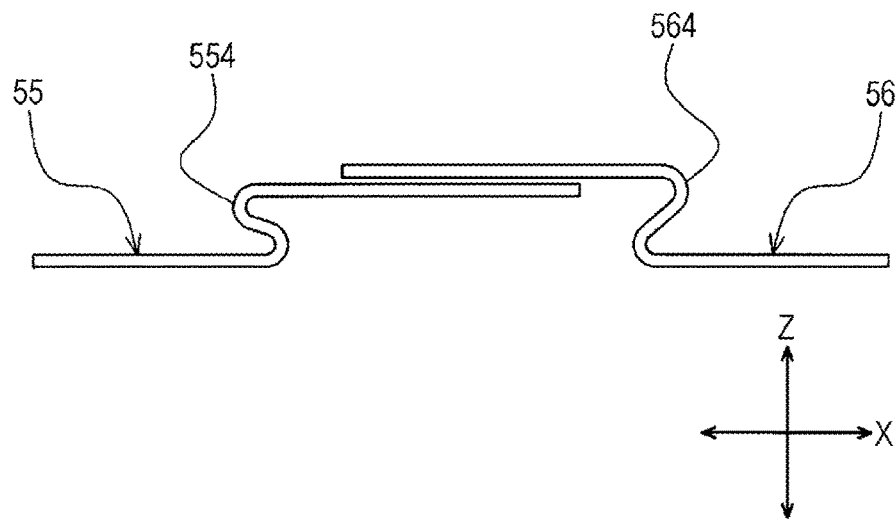
FIG. 18 is a schematic view for describing a route-around portion according to another embodiment.

Further, the specific configuration of the route-around portion provided to the bus bar 5 is not limited. In the above-mentioned embodiment, the first to third route-around portions 554, 564, 531 extend in a route-around manner such that the route-around portions 554, 564, 531 project in the Z axis direction as viewed in the Y axis direction. However, for example, as shown in FIG. 18, the route-around portion may be configured to extend in a route-around manner such that the route-around portion projects in the X axis direction. The route-round portion may be also configured such that the route-around portion extends in a route-around manner while projecting plural times. That is, it is sufficient for the route-around portion to have a configuration where the route-around portion includes one or a plurality of bent portions, curved portions or the like so that, when a distance in the X axis direction between the energy storage devices 10 which are connected to each other by the bus bars 5 changes, the route-around portion absorbs such a change in the distance thus preventing the concentration of a stress on the connecting portion between the bus bar 5 and the external terminal 13.

In the energy storage apparatuses 1 of the above-mentioned embodiment and the above-mentioned another embodiment, the first bus bar 51 has the first to third members 51 to 53, and the end portion bus bar 53A has the first to third members 91 to 93. However, the present invention is not limited to such a configuration. For example, the first bus bar 51 and the end portion bus bar 53A may be respectively configured to have only the first member 55, 91 and the second member 56, 92. That is, the first bus bar 51 and the end portion bus bar 53A may be respectively configured such that the first bus bar 51 and the end portion bus bar 53A do not include the third member 57, 93. Also with such a configuration, the first conductive surface 553A, 913A and the second conductive surface 563A, 922A are pressed to each other in disposing the mounting member 6 and hence, even when vibrations and the like are applied to the energy storage apparatus 1, it is possible to maintain a conductive state between the first member 55, 91 and the second member 56, 92 with certainty.

In the energy storage apparatus 1 of the above-mentioned embodiment, the mounting member 6 penetrates the first conductive portion 553 and the second conductive portion 563. However, the present invention is not limited to such a configuration. Provided that the mounting member 6 is configured to press the first conductive portion 553 and the second conductive portion 563 to the first adjacent member 21, the mounting member 6 may be configured to penetrate other portions of the first member 55 and the second member 56, or may be configured not to penetrate the first member 55 and the second member 56.

Figure 19:
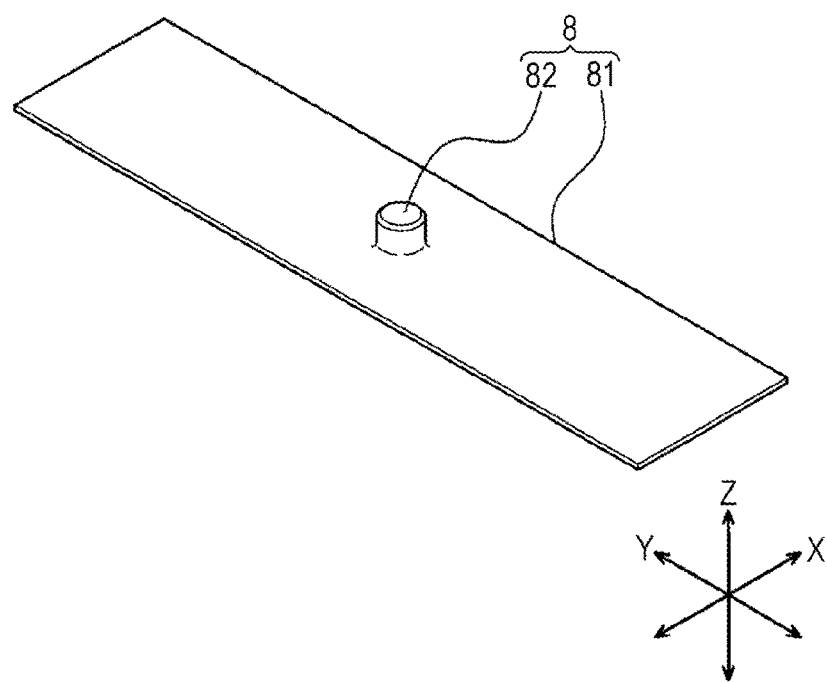
FIG. 19 is a perspective view of an insulation plate according to another embodiment.

In the above-mentioned embodiment, the insulation plate (insulation member) 8 has a rectangular plate shape. However, the present invention is not limited to such a configuration. For example, as shown in FIG. 19, an insulation plate 8A may be configured to include: a plate-like body 81 which is insertable between conductive surfaces, that is, between the first conductive surface 553A and the second conductive surface 563A; and a projecting portion 82 which projects from the body 81. Although the projecting portion 82 in the example shown in FIG. 19 has a circular cylindrical shape, the present invention is not limited to such a configuration. The projecting portion 82 may not have a hollow shape and may be formed of a solid body. Further, the projecting portion 82 may have a columnar shape having a different cross-sectional shape such as a prismatic shape.

In this case, a size of the body 81 in the inserting direction toward between the conductive surfaces 553A, 563A is larger than at least one of a size of the first conductive surface 553A and a size of the second conductive surface 563A in the inserting direction so that when the body 81 is inserted between the conductive surfaces 553A, 563A, the projecting portion 82 is disposed at a portion of the body 81 projecting from between the conductive surfaces 553A, 563A.

Figure 20:
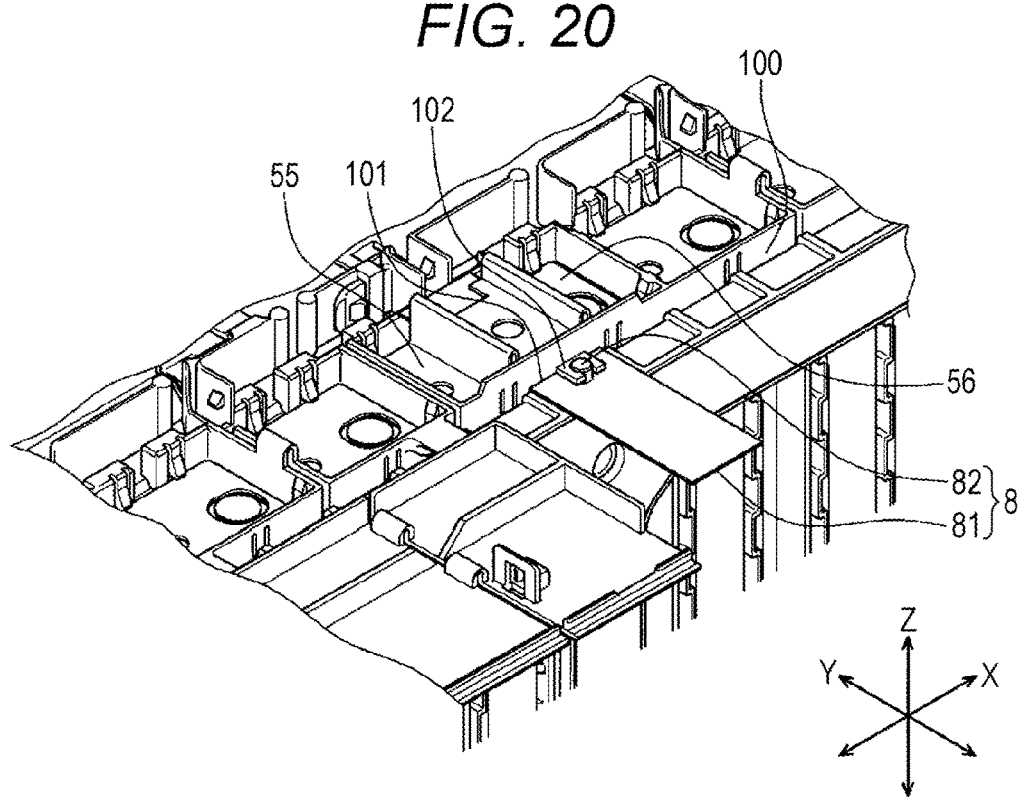
FIG. 20 is a partially enlarged perspective view of an insulation plate according to another embodiment in a state where the insulation plate is inserted into an elongated hole formed in a bus bar plate.

In this case, as shown in FIG. 20, the energy storage apparatus 1 includes a bus bar plate 100 which holds the bus bar 5. The bus bar plate 100 has an elongated hole 101 or the like at a position corresponding to a position where the first conductive surface 553A and the second conductive surface 563A are made to overlap with each other (in the example shown in FIG. 20, a position where the first conductive surface 553A and the second conductive surface 563A are made to overlap with each other in the Y axis direction) and, at the same time, has an engaging portion 102 which engages with the projecting portion 82. The elongated hole 101 has a size which allows the insertion of the body 81 of the insulation plate 8 thereinto. When the insulation plate 8 is inserted into the elongated hole 101, the projecting portion 82 is inserted into the elongated hole 101 by being pressed with a force equal to or more than a predetermined force and hence, the engaging portion 102 engages with the projecting portion 82. The specific configuration of the engaging portion 102 is not limited to such a configuration. That is, it is sufficient that the engaging portion 102 engage with the projecting portion 82 in a state where the insulation plate 8 can be pulled out.

With such a configuration, the projecting portion 82 is made to engaged with the energy storage apparatus 1 (to be more specific, the engaging portion 102 of the bus bar plate 100) when the body 81 is inserted between the first conductive surface 553A and the second conductive surface 563A of the bus bar 5 which includes the first member 55 and the second member 56. With such an engagement, the body 81 of the insulation plate 8 is minimally removed from between the first conductive surface 553A and the second conductive surface 563A. Accordingly, even when swinging, vibrations or the like is applied to the energy storage apparatus 1 on which the insulation plate 8 is mounted, it is possible to maintain a state where electricity cannot be inputted to or outputted from the energy storage apparatus 1. In the energy storage apparatus 1, a portion (member) with which the projecting portion 82 of the insulation plate 8 is to be engaged is not limited to the bus bar plate 100, and may be a part of the energy storage apparatus 1. That is, the engaging portion 102 may be formed on portions (members) of the energy storage apparatus 1 other than the bus bar plate.

Figure 21:
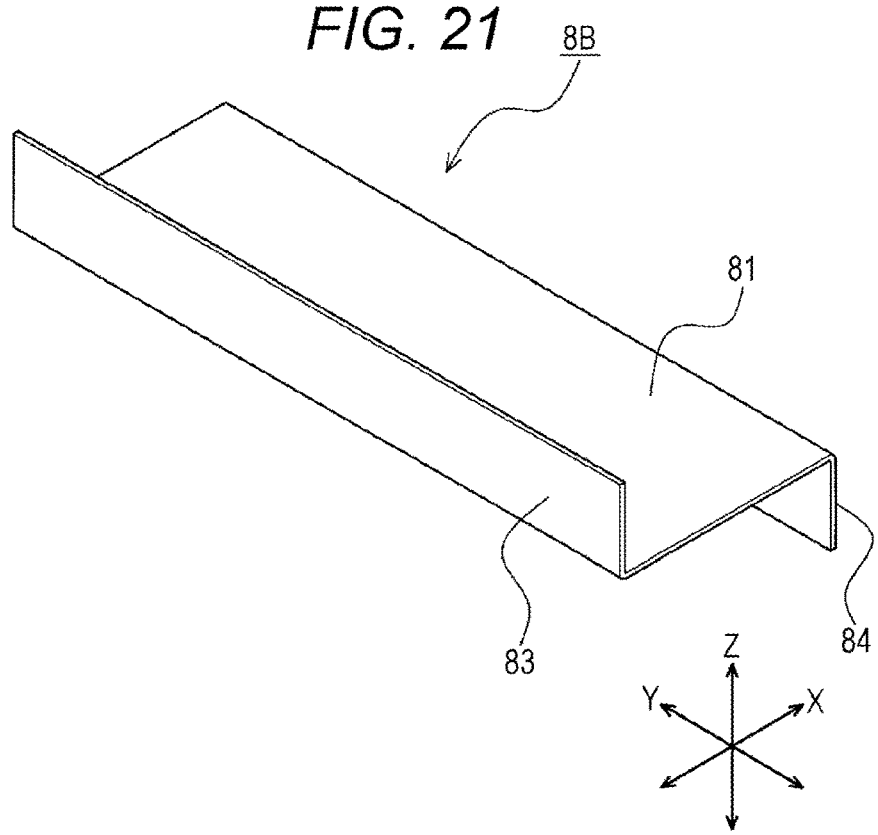
FIG. 21 is a perspective view of an insulation plate according to another embodiment.
Figure 22:
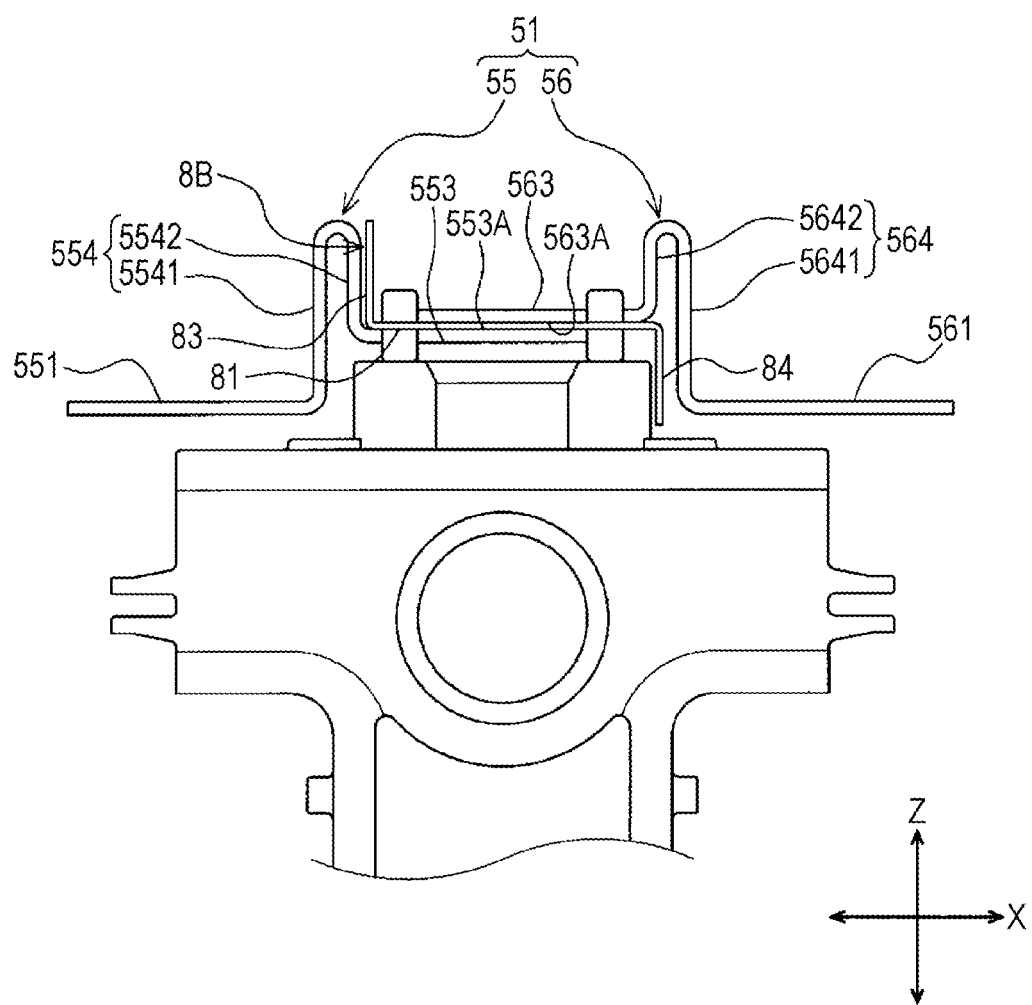
FIG. 22 is a view for describing a state where the insulation plate is disposed between a first member and a second member which form an intermediate bus bar.

For example, as shown in FIG. 21 and FIG. 22, an insulation plate 8B may include: a plate-like body 81 which is insertable between the conductive surfaces, that is, between the first conductive surface 553A and the second conductive surface 563A; a first projecting portion 83 which extends toward one surface side (upward in FIG. 22) of the body 81 from one end portion of the body 81 (an end portion of the body 81 on a first member 55 side in the X axis direction in a state where the body 81 is inserted between the conductive surfaces 553A, 563A); and a second projecting portion 84 which extends toward the other surface side (downward in FIG. 22) of the body 81 from the other end portion of the body 81 (an end portion of the body 81 on a second member 56 side in the X axis direction in a state where the body 81 is inserted between the conductive surfaces 553A, 563A). In this case, the first projecting portion 83 extends from the body 81 so as to shield a gap defined between an end surface of the second conductive portion 563 on a first member 55 side which includes the second conductive surface 563A (an end surface on a left end in FIG. 22) and a member (portion) which opposedly faces the end surface. The second projecting portion 84 extends from the body 81 so as to shield a gap defined between an end surface of the first conductive portion 553 on a second member 56 side which includes the first conductive surface 553A (an end surface on a right end in FIG. 22) and a member (portion) which opposedly faces the end surface.

Figure 23:
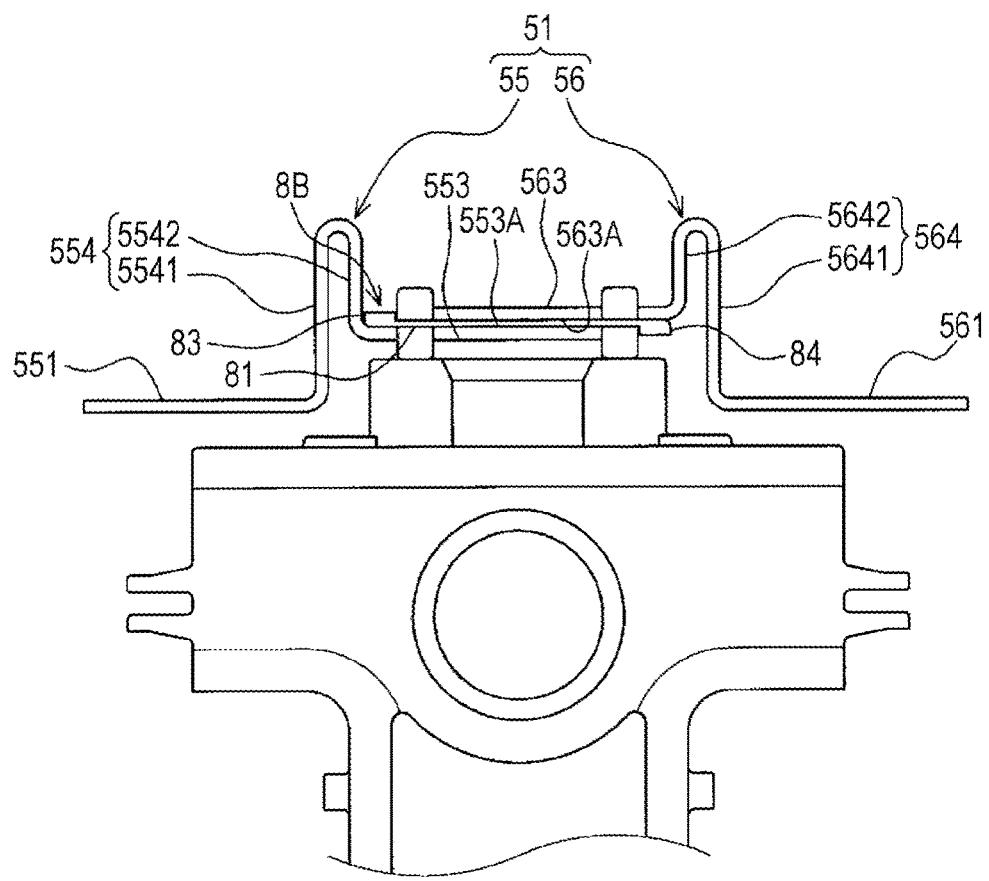
FIG. 23 is a view for describing a state where an insulation plate according to another embodiment is disposed between a first member and a second member which form an intermediate bus bar.

In the example shown in FIG. 21, the first projecting portion 83 and the second projecting portion 84 are formed into a plate shape. However, the present invention is not limited to such a configuration. For example, as shown in FIG. 23, the first projecting portion 83 and the second projecting portion 84 may be formed by setting a thickness size of the end portion of the body 81 in the X axis direction larger than a thickness size of other portions of the body 81 in the X axis direction or the like. Further, in the insulation plate 8B shown in FIG. 21, the first projecting portion 83 and the second projecting portion 84 are continuously formed in a direction (Y axis direction) that an end edge of the body 81 in the X axis direction extends. However, the present invention is not limited to such a configuration, and the first projecting portion 83 and the second projecting portion 84 may be formed intermittently in the direction that the end edge extends.

With such configurations, when a distance between the energy storage devices 10 (a distance in the X axis direction) where the first member 55 and the second member 56 are connected to the external terminals 13 respectively is decreased, the contacting of a second-member-56-side distal end of the first conductive portion 553 with a portion which opposedly faces the distal end in the X axis direction (the first raised portion 5641 in the example shown in FIG. 22) is prevented by the second projecting portion 84 and, at the same time, the contacting of a first-member-55-side distal end of the second conductive portion 563 with a portion which opposedly faces the distal end in the X axis direction (the second raised portion 5542 in the example shown in FIG. 22) is prevented by the first projecting portion 83. With such a configuration, even when a distance between the energy storage devices 10 is decreased, it is possible to prevent the first conductive portion 553 from being brought into contact with the second member 56 with certainty, and it is also possible to prevent the second conductive portion 563 from being brought into contact with the first member 55 with certainty.

The energy storage apparatus 1 of the above-mentioned embodiment includes the terminal bases 7. However, the energy storage apparatus 1 is not limited to such a configuration. The energy storage apparatus 1 may not include the terminal bases 7. In this case, in a plurality of energy storage devices 10 which are connected to each other in series by a plurality of bus bars 5, bus bars 5 which are connected to external terminals 13 positioned at outermost ends (the end on a positive electrode side and the end on a negative electrode side) of a current path respectively function as total terminals.

In the energy storage apparatus 1 of the above-mentioned embodiment, the first bus bar 51 where the first conductive surface 553A and the second conductive surface 563A are made to overlap with each other in a separable manner connects the external terminals 13 of the energy storage devices 10 which are disposed adjacently to each other with the first adjacent member 21 interposed therebetween (in a conductive manner). However, the present invention is not limited to such a configuration. For example, the first bus bar 51 may be configured to connect the external terminals 13 of the energy storage devices 10 which are disposed adjacently to each other with the second adjacent member 22 interposed therebetween.

In the energy storage apparatus 1 of the above-mentioned embodiment, the first bus bar 51 connects two external terminals 13 to each other (in a conductive manner). However, the present invention is not limited to such a configuration. The first bus bar 51 may be configured to connect three or more external terminals 13 to each other. For example, to be more specific, the first member 55 may be connected to two or more external terminals 13 on one side of the first adjacent member 21 in the X axis direction, and the second member 56 may be connected to two or more external terminals 13 on the other side of the first adjacent member 21 in the X axis direction.

In the energy storage apparatus 1 of the above-mentioned embodiment and the above-mentioned another embodiment, the bus bar 5 where the first conductive surface 553A, 913A and the second conductive surface 563A, 922A are made to overlap with each other in a separable manner connects the external terminals 13 of the energy storage devices 10 disposed adjacently to each other with the adjacent member 2 interposed therebetween to each other or connects the total terminal 71 and the external terminal 13 of the energy storage device 10 which are disposed adjacently to each other with the adjacent member 2 interposed therebetween to each other. However, the present invention is not limited to such a configuration. The bus bar 5 where the first conductive surface 553A, 913A and the second conductive surface 563A, 922A are made to overlap with each other in a separable manner may be configured to connect the external terminals 13 of the energy storage devices 10 which are disposed adjacently to each other in a state where the adjacent member 2 is not interposed therebetween to each other (in a conductive manner).

In the energy storage apparatus 1 of the above-mentioned embodiment, the bus bar 5 is connected (fixedly mounted) to the external terminals 13 of the energy storage devices 10 by welding. However, the present invention is not limited to such a configuration. For example, a configuration may be adopted where the external terminal of the energy storage device 10 is formed of a bolt (in other words, using a bolt terminal type energy storage device), and a nut is threadedly engaged with the bolt-type external terminal in a state where the external terminal is made to penetrate the bus bar 5 and hence, the bus bar 5 is connected (fixed) to the external terminal. That is, the bus bar 5 may be fixed (connected) to the external terminal of the energy storage device 10 in a removable manner.

What is claimed is:

1. An energy storage apparatus, comprising:
   a plurality of energy storage devices disposed in a row in a first direction and each including an external terminal; and
   a bus bar configured to make the external terminals of the different energy storage devices conductive with each other,
   wherein the bus bar includes at least a first member connected to the external terminal of a predetermined energy storage device among the plurality of energy storage devices, and a second member connected to the external terminal of another energy storage device among the plurality of energy storage devices,
   wherein the first member and the second member form a conductive path by being directly or indirectly conductive with each other,
   wherein the conductive path includes a middle portion thereof formed in a separable manner or an interrupting manner,
   wherein the first member include a first connection portion connected to the external terminal of the predetermined energy storage device among the plurality of energy storage devices and a first extension portion extending from the first connection portion, wherein the second member includes a second connection portion connected to the external terminal of another energy storage device among the plurality of energy storage devices and a second extension portion extending from the second connection portion, wherein the first extension portion includes a first conductive surface, and the second extension portion includes a second conductive surface which is configured to overlap with the first conductive surface in a separable manner in a state where the second conductive surface faces the first conductive surface, wherein at least one of the first extension portion and the second extension portion includes a route-around portion which bends at a position closer to the first connection portion than a portion which includes the first conductive surface or the second conductive surface or at a position closer to the second connection portion than the portion which includes the first conductive surface or the second conductive surface, wherein the route-around portion includes:
a first raised portion which is raised from an end of the first connection portion; and
a second raised portion which is raised from an end of the first conductive surface in a spaced-apart manner from the first raised portion in the first direction, and
wherein the first raised portion and the second raised portion are connected to each other.

2. The energy storage apparatus according to claim 1, wherein the first conductive surface and the second conductive surface include a flat surface which extends in the first direction respectively.

3. The energy storage apparatus according to claim 1, further comprising:
an insulation member which is inserted between the first conductive surface and the second conductive surface such that the insulation member is removable by pulling from between the first conductive surface and the second conductive surface.

4. The energy storage apparatus according to claim 1, wherein the first extension portion includes a first guide portion extending from an end edge of the first conductive surface,
wherein the second extension portion includes a second guide portion extending from a position of an end edge of the second conductive surface which corresponds to the first guide portion, and
wherein a distance between the first guide portion and the second guide portion is increased as the first guide portion and the second guide portion distance from the first conductive surface and the second conductive surface.

5. The energy storage apparatus according to claim 1, wherein
an adjacent member is disposed between the energy storage devices disposed adjacently to each other in a first direction,
wherein the bus bar includes a connection member which connects the first member and the second member to each other in a conductive manner, and connects external terminals of the energy storage devices disposed on both sides of the adjacent member in the first direction to each other, and
wherein the connection member is brought into contact with at least one of the first member and the second member in a separable manner.

6. The energy storage apparatus according to claim 1, wherein the first member and the second member are directly conductive with each other.

7. The energy storage apparatus according to claim 1, wherein the route-around portion bends at the position closer to the first connection portion than the portion which includes the first conductive surface or the second conductive surface.

8. The energy storage apparatus according to claim 1, wherein the route-around portion bends at the position closer to the second connection portion than the portion which includes the first conductive surface or the second conductive surface.

9. The energy storage apparatus according to claim 1, further comprising:
an adjacent member disposed between the energy storage devices disposed adjacently to each other in the first direction; and
a mounting member configured to be removably mounted on the adjacent member and directly contacting with the adjacent member.

10. The energy storage apparatus according to claim 9, wherein the first conductive surface and the second conductive surface include a flat surface which intersects with a direction that the mounting member presses the first conductive surface and the second conductive surface toward the adjacent member.

11. The energy storage apparatus according to claim 9, wherein the bus bar further includes a third member which is configured to overlap with the first extension portion and the second extension portion from a side opposite to the adjacent member.

12. The energy storage apparatus according to claim 11, wherein the adjacent member includes a female threaded portion at a position where the adjacent member overlaps with the bus bar in a second direction.

13. The energy storage apparatus according to claim 12, wherein the mounting member includes a male threaded portion which is threaded into the female threaded portion in a state where the male threaded portion penetrates the first extension portion, the second extension portion, and the third member in an overlapping state from a side of the third member.

14. An energy storage apparatus, comprising:
a plurality of energy storage devices disposed in a row in a first direction and each including an external terminal; and
a bus bar configured to make the external terminals of the different energy devices conductive with each other,
wherein the bus bar includes at least a first member connected to the external terminal of a predetermined energy storage device among the plurality of energy storage devices, and second member connected to the external terminal of another energy storage device among the plurality of energy storage devices,
wherein the first member and the second member form a conductive path by being directly or indirectly conductive with each other,
wherein the conductive path includes a middle portion thereof formed in a separable manner or an interrupting manner,
wherein the first member includes a first connection portion connected to the external terminal of the predetermined energy storage device among the plurality of energy storage devices and a first extension portion extending from the first connection portion, wherein the second member includes a second connection portion connected to the external terminal of another energy storage device among the plurality of energy storage devices and a second extension portion extending from the second connection portion, wherein the first extension portion includes a first conductive surface, wherein the second extension portion includes a second conductive surface which is configured to overlap with the first conductive surface in a separable manner in a state where the second conductive surface faces the first conductive surface, wherein the energy storage apparatus further comprises:
an adjacent member disposed between the energy storage devices disposed adjacently to each other in the first direction; and
a mounting member configured to be removably mounted on the adjacent member and directly contacting with the adjacent member, wherein the bus bar connects the external terminals of the energy storage devices disposed on both sides of the adjacent member to each other in the first direction, wherein the mounting member is configured to press a first conductive portion which is a portion including the first conductive surface of the first extension portion and a second conductive portion which is a portion including the second conductive surface of the second extension portion to the adjacent member, and wherein the first conductive surface and the second conductive surface include a flat surface which intersects with a direction that the mounting member presses the first conductive portion and the second conductive portion toward the adjacent member.

15. The energy storage apparatus according to claim 14, wherein the bus bar further includes a third member which is configured to overlap with the first extension portion and the second extension portion from a side opposite to the adjacent member.

16. The energy storage apparatus according to claim 15, wherein the adjacent member includes a female threaded portion at a position where the adjacent member overlaps with the bus bar in a second direction, and
wherein the mounting member includes a male threaded portion which is threaded into the female threaded portion in a state where the male threaded portion penetrates the first extension portion, the second extension portion, and the third member in an overlapping state from a side of the third member.

17. An energy storage apparatus, comprising:
a plurality of energy storage devices disposed in a row in a first direction and each including an external terminal; and
a bus bar configured to make the external terminals of the different energy storage devices conductive with each other,
wherein the bus bar includes at least a first member connected to the external terminal of a predetermined energy storage device among the plurality of energy storage devices, and a second member connected to the external terminal of another energy storage device among the plurality of energy storage devices, wherein the first member and the second member form a conductive path by being directly, or indirectly conductive with each other, wherein the conductive path includes a middle portion thereof formed in a separable manner or an interrupting manner, wherein the first member includes a first connection portion connected to the external terminal of the predetermined energy storage device among the plurality of energy storage devices and a first extension portion extending from the first connection portion, wherein the second member includes a second connection portion connected to the external terminal of another energy storage device among the plurality of energy storage devices and a second extension portion extending from the second connection portion, wherein first extension portion includes a first conductive surface, wherein the second extension portion includes a second conductive surface which is configured to overlap with the first conductive surface in a separable manner in a state where the second conductive surface faces the first conductive surface, wherein the energy storage apparatus further comprises:
an adjacent member disposed between the enemy storage devices disposed adjacently to each other in the first direction; and
a mounting member configured to be removable mounted on the adjacent member, wherein the bus bar connects the external terminals of the energy storage devices disposed on both sides of the adjacent member to each other in the first direction, wherein the mounting member is configured to press a first conductive portion which is portion including the first conductive surface of the first extension portion and a second conductive portion which is a portion including the second conductive surface of the second extension portion to the adjacent member, and wherein the first conductive surface and the second conductive surface include a flat surface which intersects with a direction that the mounting member presses the first conductive portion and the second conductive portion toward the adjacent member, wherein the bus bar further includes a third member which is configured to overlap with the first extension portion and the second extension portion from a side opposite to the adjacent member, wherein the adjacent member includes a female threaded portion at a position where the adjacent member overlaps with the bus bar in a second direction, wherein the mounting member includes a male threaded portion which is threaded into the female threaded portion in a state where the male threaded portion penetrates the first extension portion, the second extension portion and the third member in an overlapping state from a side of the third member, and wherein the third member includes a contact portion which is brought into contact with the adjacent member in a rotational direction when the male threaded portion is threaded into the female threaded portion.

* * * * *